US012774100B2

(12) United States Patent
Carle et al.

(10) Patent No.: US 12,774,100 B2
(45) Date of Patent: Oct. 27, 2026

(54) AIRCRAFT WITH AN UNDUCTED FAN PROPULSOR

(71) Applicant: General Electric Company, Evendale, OH (US)

(72) Inventors: Sara Elizabeth Carle, Columbus, OH (US); Daniel L. Tweedt, West Chester, OH (US); Syed Arif Khalid, West Chester, OH (US); Andrew Breeze-Stringfellow, Montgomery, OH (US); William Bowden, Cleves, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/357,970

(22) Filed: Oct. 14, 2025

(65) Prior Publication Data

US 2026/0035080 A1 Feb. 5, 2026

Related U.S. Application Data

(63) Continuation-in-part of application No. PCT/US2024/040754, filed on Aug. 2, 2024, which is
(Continued)

(51) Int. Cl.
*B64D 27/18* (2006.01)
*B64C 11/00* (2006.01)
(Continued)

(52) U.S. Cl.
CPC ............ *B64D 27/18* (2013.01); *B64C 11/008* (2013.01); *B64C 11/04* (2013.01); *B64D 35/04* (2013.01)

(58) Field of Classification Search
CPC ....... B64D 27/12; B64C 11/305; B64C 11/48; F01D 5/022
See application file for complete search history.

(56) References Cited

U.S. PATENT DOCUMENTS 2,419,787 A 4/1947 Muffly
2,594,160 A 4/1952 Hansson
(Continued)

FOREIGN PATENT DOCUMENTS

CN 1975130 6/2007
EP 0203881 12/1986
(Continued)

OTHER PUBLICATIONS

"Pratt & Whitney Canada PW600" (Aug. 1, 2012). In Wikipedia, The Free Encyclopedia. Retrieved Feb. 20, 2017 from waybackmachine.com https ://web.arch ive.org/web/20120801 044400/https :/ /en .wikipedia.org/wiki/Pratt_ %26 Whitney_Canada PW600.
(Continued)

*Primary Examiner* — Joshua J Michener
*Assistant Examiner* — Cindi M Curry
(74) *Attorney, Agent, or Firm* — Fitch, Even, Tabin & Flannery, LLP

(57) ABSTRACT

The present disclosure is generally related to aircraft having one or more unducted fan propulsors at locations within specific regions relative to an airfoil, such as a wing or horizontal stabilizer. More specifically, the specific regions are located where there is a relatively higher pressure air flow beneath the wings or above a horizontal stabilizer. That higher pressure air flow can be utilized to provide increased thrust from the unducted fan propulsor.

20 Claims, 18 Drawing Sheets

Related U.S. Application Data a continuation-in-part of application No. 18/652,052, filed on May 1, 2024, now Pat. No. 12,384,522, which is a continuation-in-part of application No. 18/230,609, filed on Aug. 4, 2023, now Pat. No. 12,365,471.

(51) Int. Cl.
*B64C 11/04* (2006.01)
*B64D 35/04* (2006.01)

(56) References Cited

U.S. PATENT DOCUMENTS

| | | | | |
|---|---|---|---|---|
| 3,687,569 | A | 8/1972 | Klompas | |
| 3,893,789 | A | 7/1975 | Andrews | |
| 3,922,852 | A | 12/1975 | Drabek | |
| 4,704,862 | A | 11/1987 | Dennison | |
| 4,887,424 | A | 12/1989 | Geidel | |
| 5,028,207 | A | 7/1991 | Rohra | |
| 5,079,916 | A | 1/1992 | Johnson | |
| 5,135,185 | A | 8/1992 | Adamson | |
| 5,136,185 | A | 8/1992 | Fleming | |
| 5,584,586 | A | 12/1996 | Casarcia | |
| 7,840,301 | B2 | 11/2010 | Staroselsky | |
| 8,104,972 | B2 | 1/2012 | Maguire | |
| 8,714,475 | B2 | 5/2014 | Gall | |
| 8,834,095 | B2 | 9/2014 | Davis | |
| 8,869,504 | B1 | 10/2014 | Schwarz | |
| 9,242,721 | B2 | 1/2016 | Neuteboom | |
| 9,567,090 | B2 | 2/2017 | Gallet | |
| 9,759,160 | B2 | 9/2017 | Sankrithi | |
| 9,797,407 | B2 | 10/2017 | Burghardt | |
| 10,040,559 | B2 | 8/2018 | Hoisington | |
| 10,094,278 | B2 | 10/2018 | Sheridan | |
| 10,190,496 | B2 | 1/2019 | Schwarz | |
| 10,371,096 | B2 | 8/2019 | Miller | |
| 10,442,541 | B2 | 10/2019 | Miller | |
| 10,669,881 | B2 | 6/2020 | Breeze-Stringfellow | |
| 10,907,495 | B2 | 2/2021 | Breeze-Stringfellow | |
| 11,136,109 | B2 | 10/2021 | Wood | |
| 11,225,975 | B2 | 1/2022 | Miller | |
| 12,000,344 | B2 | 6/2024 | Levisse | |
| 12,280,883 | B2 * | 4/2025 | Bowden | B64D 27/402 |
| 12,305,579 | B2 | 5/2025 | Taillant | |
| 12,313,081 | B2 | 5/2025 | Frantz | |
| 12,320,305 | B2 | 6/2025 | Martinez Luque | |
| 12,359,588 | B1 * | 7/2025 | Khalid | F01D 21/003 |
| 12,365,446 | B2 | 7/2025 | Carle | |
| 12,365,471 | B2 | 7/2025 | Carle | |
| 12,378,933 | B2 | 8/2025 | Fefermann | |
| 12,384,522 | B2 | 8/2025 | Carle | |
| 12,448,139 | B2 * | 10/2025 | Bowden | B64D 29/02 |
| 2012/0119023 | A1 | 5/2012 | Moore | |
| 2013/0025258 | A1 | 1/2013 | Merry | |
| 2014/0119908 | A1 | 5/2014 | Chrabascz | |
| 2014/0283500 | A1 | 9/2014 | Sabnis | |
| 2015/0016994 | A1 | 1/2015 | Burghardt | |
| 2016/0032740 | A1 | 2/2016 | Niergarth | |
| 2018/0362170 | A1 * | 12/2018 | Stuart | B64D 27/12 |
| 2019/0185170 | A1 | 6/2019 | Schelfaut | |
| 2023/0021836 | A1 | 1/2023 | Riddle | |
| 2024/0410319 | A1 | 12/2024 | Becoulet | |
| 2025/0018895 | A1 | 1/2025 | Howell | |
| 2025/0042537 | A1 | 2/2025 | Carle | |
| 2025/0042538 | A1 | 2/2025 | Carle | |
| 2025/0042558 | A1 | 2/2025 | Carle | |
| 2025/0052165 | A1 | 2/2025 | Becoulet | |
| 2025/0075636 | A1 | 3/2025 | Frantz | |
| 2025/0101930 | A1 | 3/2025 | Auriol | |
| 2025/0116203 | A1 | 4/2025 | Olivier | |
| 2025/0129724 | A1 | 4/2025 | Millier | |
| 2025/0137407 | A1 | 5/2025 | Becoulet | |
| 2025/0188951 | A1 | 6/2025 | Lebeault | |
| 2025/0197014 | A1 | 6/2025 | Gea Aguilera | |
| 2026/0008550 | A1 | 1/2026 | Carle | |
| 2026/0015090 | A1 | 1/2026 | Carle | |

FOREIGN PATENT DOCUMENTS

| | | | |
|---|---|---|---|
| FR | 3129428 | A1 | 5/2023 |
| FR | 3129436 | A1 | 5/2023 |
| FR | 3129690 | A1 | 6/2023 |
| FR | 3129970 | A1 | 6/2023 |
| FR | 3129972 | A1 | 6/2023 |
| FR | 3130313 | A1 | 6/2023 |
| FR | 3130747 | A1 | 6/2023 |
| FR | 3130874 | A1 | 6/2023 |
| FR | 3130875 | A1 | 6/2023 |
| FR | 3130895 | A1 | 6/2023 |
| FR | 3130897 | A1 | 6/2023 |
| FR | 3132729 | A1 | 8/2023 |
| JP | 2007100928 | | 4/2007 |
| JP | 2013079680 | | 5/2013 |
| WO | 2014152101 | | 9/2014 |
| WO | 2015047489 | | 4/2015 |
| WO | 2015048464 | | 4/2015 |
| WO | 2025034565 | | 2/2025 |

OTHER PUBLICATIONS

Brines, “The turbofan of tomorrow,” American Society of Mechanical Engineers, Mechanical Engineering-CIME, vol. 112, Issue 8 (1990).

Takashi Nishikawa, et al. “Technical Trend of Aircraft Bearings”, NTN Technical Review No. 82, p. 083-087, Oct. 2014. Obtained from <http://www.ntnglobal.com/en/products/review/pdf/NTN_TR82_en_083_087p.pdf> on Jan. 31, 2018.

Willis, Quiet Clean Short-Haul Experimental Engine (QCSEE) Final Report, National Aeronautics and Space Administration, NASA-Lewis Research Center (1979).

“Could an open fan engine cut carbon emissions for more sustainable aviation?”; https://www.airbus.com/en/newsroom/stories/2022-07-could-an-open-fan-engine-cut-carbon-emissions-for-more-sustainable; Jul. 19, 2022; 3 pgs.

Antonov An-70—Price, Specs, Photo Gallery, History—Aero Corner; https://aerocorner.com/aircraft/ antonov-an-70/#lg=1&slide=5; Site was known as early as Dec. 2021; 5 pgs.

Attariwala, Joetey; “Coming to a Theatre near You”; published Feb./Mar. 2016 Issue (Oct. 26, 2017); https://www.armadainternational.com/2017/10/airbus-a400m-strategic-turboprop-freighter-programme/; 9 pgs.

* cited by examiner

AIRCRAFT WITH AN UNDUCTED FAN PROPULSOR

CROSS-REFERENCE TO RELATED APPLICATION

This application is a continuation-in-part of International Appl. No. PCT/US2024/040754, filed Aug. 2, 2024, which claims priority to U.S. patents application Ser. No. 18/230,609, filed on Aug. 4, 2023, and Ser. No. 18/652,052, filed May 1, 2024, the latter of which is a continuation-in-part of the former, the disclosures of which are hereby incorporated by reference in their entireties.

TECHNICAL FIELD

The present disclosure relates generally to an aircraft with a fan propulsor.

BACKGROUND

Winged aircraft have undermounted propulsors in the form of a turboprop engine. The addition of a propulsor to a wing can lead to installation penalties, including increased drag. As the size of the undermounted propulsor increases, installation penalties can also increase, such as increased weight.

BRIEF DESCRIPTION OF THE DRAWINGS

A full and enabling disclosure of the aspects of the present description, including the best mode thereof, directed to one of ordinary skill in the art, is set forth in the specification, which refers to the appended figures, in which.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Aspects and advantages of the present disclosure will be set forth in part in the following description or may be learned through practice of the present disclosure.

The word "or" when used herein shall be interpreted as having a disjunctive construction rather than a conjunctive construction unless otherwise specifically indicated.

The terms "coupled," "fixed," "attached to," and the like, refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

The term "at least one of" in the context of, e.g., "at least one of A, B, and C" refers to only A, only B, only C, or any combination of A, B, and C.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "leading edge" refers to components and/or surfaces which are oriented predominately upstream relative to the fluid flow of the system, and the term "trailing edge" refers to components and/or surfaces which are oriented predominately downstream relative to the fluid flow of the system.

"Airfoil section" and "effective quarter chord point (QC)" are defined as follows.

Figure 6A:
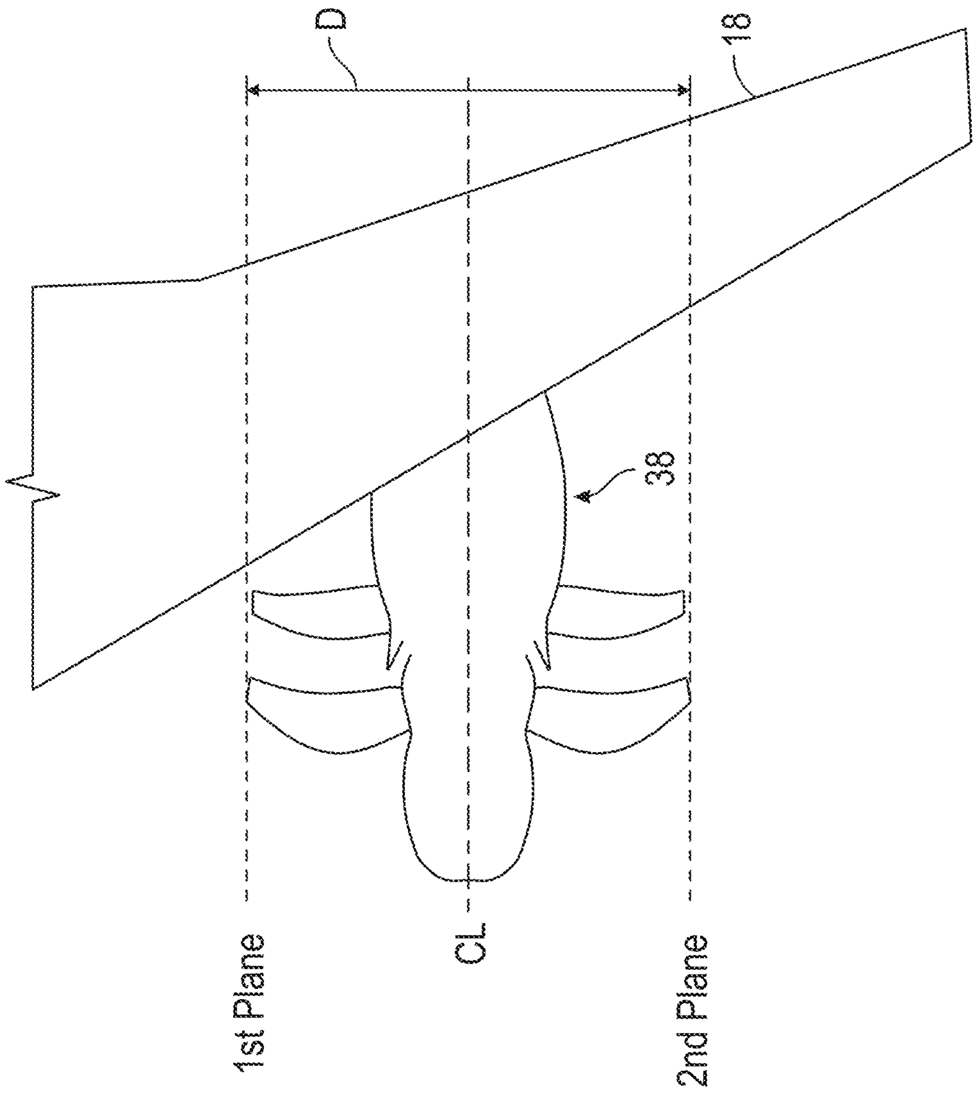
FIG. 6A comprises a top plan view of the propulsor of FIG. 4 and inboard and outboard locations of the wing relative to an unducted fan propulsor centerline, with the inboard and outboard locations in FIG. 6A used to determine a chord length (C) of the airfoil section in FIG. 4.
Figure 6B:
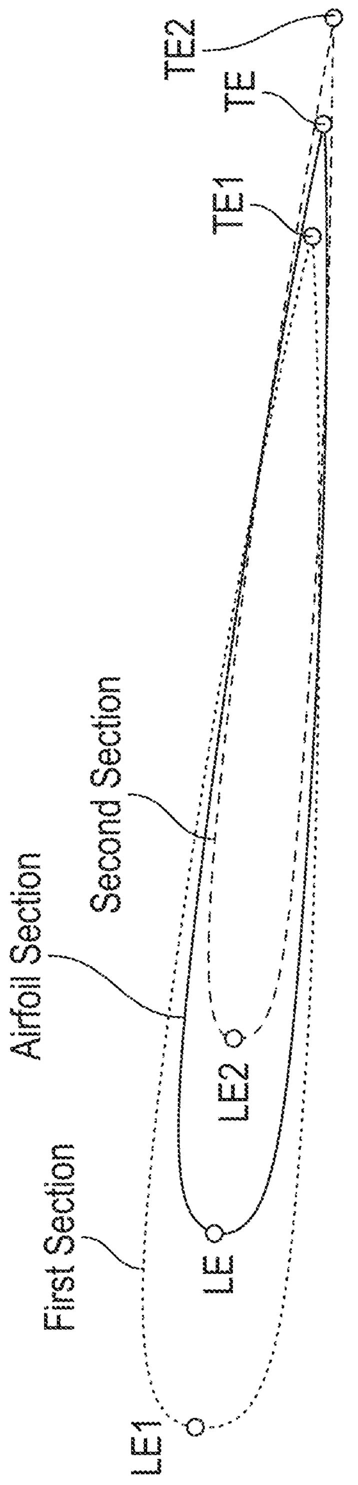
FIG. 6B comprises a schematic side elevation view of a first section and a second section of the aircraft wing, which sections are used to determine an effective quarter chord point (QC) of the airfoil section in FIG. 4.

"Airfoil section" is defined as the average of a first offset plane section and a second offset plane section of an airfoil (e.g., an airfoil associated with a horizontal stabilizer or wing of an aircraft), where the first offset plane section is the section of the airfoil taken at a first plane and the second offset plane section is the section of the airfoil taken at a second plane, the first and second planes each being offset in a direction perpendicular to, and equidistant from a central plane by a distance of ½ of a fan diameter (D) of rotating blades of a propulsor mounted to the portion of the aircraft body associated with the airfoil section (wing or horizontal stabilizer). The first plane is inboard of the central plane (towards the fuselage) and the second plane is outboard of the central plane. When the aircraft is on the ground, both the gravity vector and axis of rotation of the rotating blades lie in the central plane. The intersection of the first offset plane with the airfoil defines a first section having a first section leading edge (LE1) and a first section trailing edge (TE1), with the LEI at the forward-most point of the first section and the TE1 at the aft-most point of the first section. The intersection of the second offset plane with the airfoil defines a second section having a second section leading edge (LE2) and a second section trailing edge (TE2), with the LE2 at the forward-most point of the section and the TE2 at the aft-most point of the second section. Averaging the coordinates of LE1 and LE2 yields a representative LE location for the airfoil section. Averaging the coordinates of TE1 and TE2 yields a representative TE location for the airfoil section. The LE and TE points obtained this way are indicated in FIGS. 6 and 6B. An "Airfoil Section" defined herein has its leading and trailing edges TE, LE determined in this manner. "Effective Quarter-chord point" ("QC") is defined as ¼ of the distance from the leading edge LE of the airfoil section determined in the foregoing manner, measured along the chord of this airfoil section. QC is dependent on the fan diameter (D) because the airfoil section LE and TE values change if D for the unducted fan propulsor changes.

The plurality of blades, whether forward or rearward, may have a variation of root forward-most points and root rearward-most points. This can be due to both installed position as well as orientation in the case of variable pitch blades. For purposes of defining the distances TRL, RTL, and VTL a rotating blade or a rotating array of blades is orientated such that the respective leading edges of the blades are in their most forward position, e.g., a feathered position. The respective trailing edge position is also obtained when the leading edge is in the most forward position. For purposes of defining the distances TRL, RTL, and VTL, the forward or leading edge or rearward or trailing edge of a stationary blade (or vane) or array of stationary blades (or vanes) is the most forward or leading edge position across the array of vanes or the most rearward or trailing edge position across the array of vanes.

"Blade" can refer to a stationary or rotating blade. "Stationary blade(s)" has the same meaning as "vane(s)".

As used herein, the term "cruise" or "cruising speed" refers to operation of a turbine engine utilized to power an aircraft that may operate at a cruising speed when the aircraft levels after climbing to a specified altitude. A turbine engine may operate at a cruising speed that is from 50% to 90% of a rated speed, such as from 70% to 80% of the rated speed. In some embodiments, a cruising speed may be achieved at about 80% of full throttle, such as from about 50% to about 90% of full throttle, such as from about 70% to about 80% full throttle. As used herein, the term "cruise flight" refers to a phase of flight in which an aircraft levels in altitude after a climb phase and prior to descending to an approach phase. In various examples, cruise flight may take place at a cruise altitude up to approximately 65,000 ft. In certain examples, cruise altitude is between approximately 28,000 ft. and approximately 45,000 ft. In yet other examples, cruise altitude is expressed in flight levels (FL) based on a standard air pressure at sea level, in which cruise flight is between FL280 and FL650. In another example, cruise flight is between FL280 and FL450. In still certain examples, cruise altitude is defined based at least on a barometric pressure, in which cruise altitude is between approximately 4.85 psia and approximately 0.82 psia based on a sea-level pressure of approximately 14.70 psia and sea-level temperature at approximately 59 degrees Fahrenheit. In another example, cruise altitude is between approximately 4.85 psia and approximately 2.14 psia. In certain examples, the ranges of cruise altitude defined by pressure may be adjusted based on a different reference sea-level pressure and/or sea-level temperature.

Figure 3:
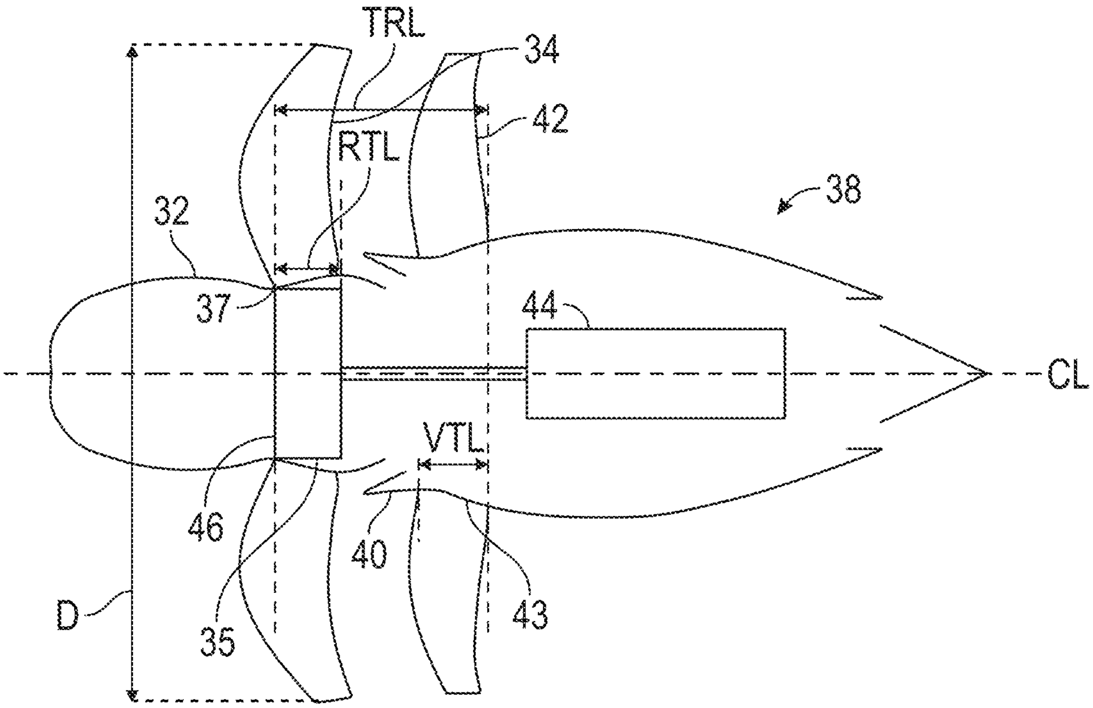
FIG. 3 comprises an elevational cross-sectional view of an exemplary unducted fan propulsor having a plurality of blades arranged in a forward array and a rearward array.
Figure 12:
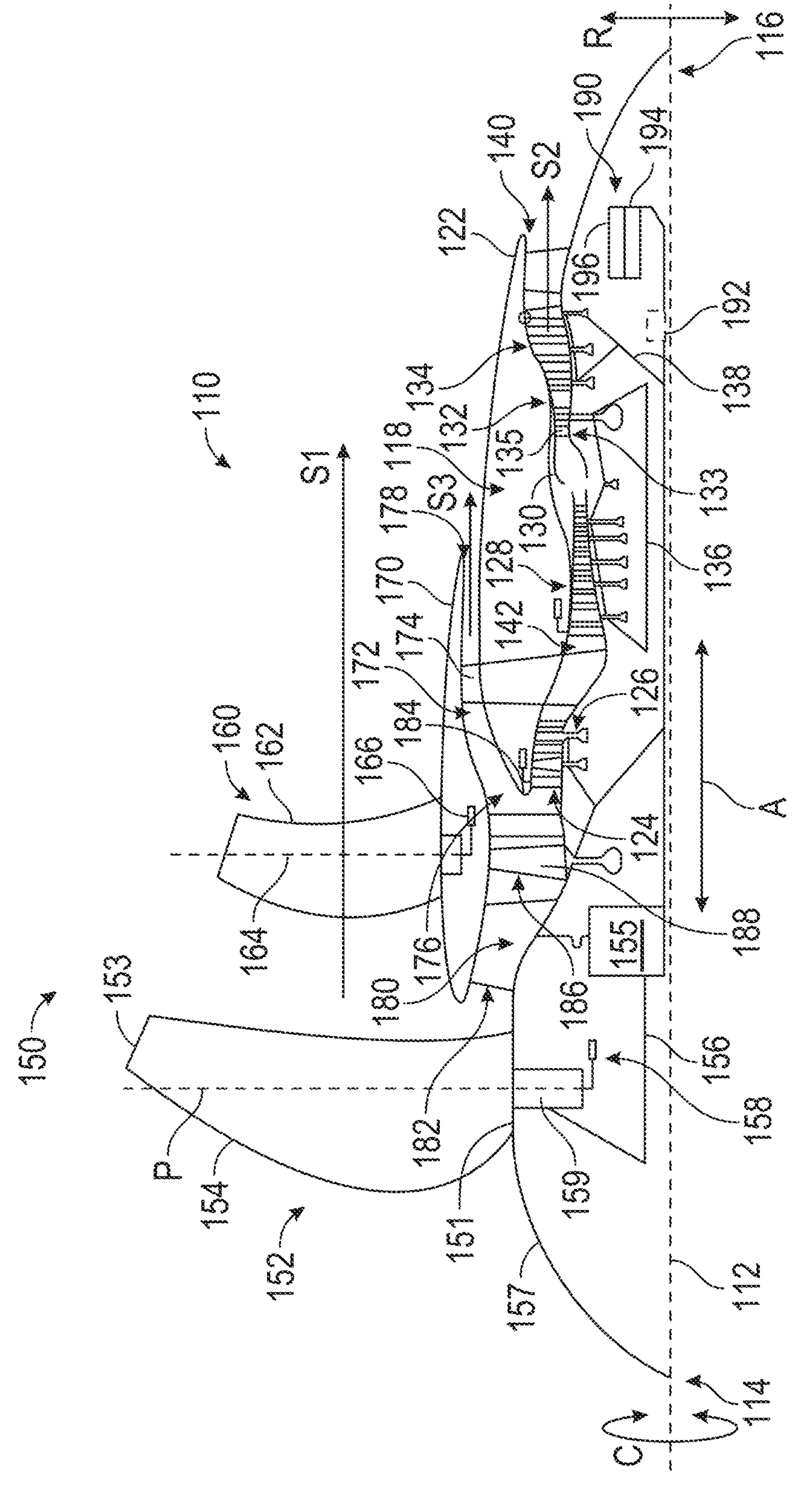
FIG. 12 shows a schematic view of an unducted fan propulsor.

As used herein, an "unducted fan propulsor," an "unducted fan engine" or an "open fan engine" means a turbofan engine without a fan casing or a nacelle surrounding the fan. An unducted fan engine can characterized by an array of rotating fan blades and static (or non-rotating), outlet guide vanes (OGV) aft of the array of rotating fan blades, or an array of rotating fan blades and static, unducted inlet guide vanes (IGV) forward of the rotating fan blades. In either case, neither the fan blades nor the IGV or OGV is surrounded by a duct or a fan nacelle. FIGS. 3 and 12 depict an unducted fan propulsor. Additionally, the term unducted fan propulsor means an unducted, fan driven aircraft engine capable of providing thrust to an aircraft to enable cruise flight speeds between 0.7 Mach and 0.90 Mach, or 0.75 to 0.85 Mach.

"Aircraft" means a vehicle having a wing (and/or horizontal stabilizer), an airfoil defined by the wing (and/or horizontal stabilizer), and one or two unducted fan propulsors mounted to the wing, and the aircraft is operable at cruise flight speeds between 0.7 Mach and 0.90 Mach, or 0.75 to 0.85 Mach.

"Fuselage centerplane" ("FCP") is defined as a plane that is located equidistant from the wingtips, intersecting the fuselage, and containing the gravity vector when the aircraft is on the ground.

As used herein, a Mach number is a ratio of the speed of the aircraft to the speed of sound in the surrounding airflow. The Mach number at cruise as defined herein is a maximum operating Mach number as provided by a Type Certificate Data Sheet (TCDS) for the turbine engine.

An aircraft's quoted cruise Mach number is generally known in the industry to be applied during a "standard day" temperature day. Therefore, the temperature is a fixed value based on altitude according to the established International Standard Atmosphere (ISA) tables. High speed civil gas turbine powered transport aircraft quote their speed by Mach number and have set cruising altitudes based on their size and mission profile (e.g., smaller aircraft fly at lower altitudes). Turboprops and smaller aircraft may have their cruising speed quoted in knots such as VTAS (velocity true airspeed) or KCAS (knots calibrated air speed), where ambient temperature is considered. Engine performance can be modeled for "hot days" or "cold days" where the ambient temperature is hotter or cooler than standard day by a prescribed amount, but this is part of off-design performance. Further, between 36,000 and 80,000 feet, where most commercial aircraft cruise, the ambient temperature is actually constant.

Approximating language, as used herein throughout the specification and claims, is applied to modify any quantitative representation that could permissibly vary without resulting in a change in the basic function to which the approximating language is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "proximate" refers to being closer to one side or end than an opposite side or end.

The inventors were faced with a problem of how to improve thrust delivered to an aircraft by an unducted fan propulsor without increasing the required engine power delivered to the unducted fan of the unducted fan propulsor.

The inventors found, unexpectedly, that the solution to this problem is heavily dependent on the location of the unducted fan propulsor relative to the aircraft wing.

The inventors found that installing an unducted fan propulsor presents the challenge of addressing penalties that can result due to the interaction with the rest of the aircraft. The manner in which these penalties are addressed according to the claimed subject matter is unique for this type of engine.

An unducted fan propulsor is particularly challenged due to the scrubbing and interference drags relative to a ducted turbofan. That additional drag then results in a higher thrust needed from the propulsor. Generally, higher thrust for a ducted turbofan comes with a larger power requirement and thus more fuel flow. For the unducted fan propulsor the inventors surprisingly found by placing the engine so that the engine can take advantage of the high pressure flow induced by the wing (and/or a horizontal stabilizer), engine thrust may increase without increasing the power requirement on the engine. This placement of the engine relative to the wing then acts to offset the scrubbing and interference drag, thus not increasing the required fuel (or reducing the increased fuel flow required for a non-optimum engine placement). The inventors found that increased drag effects associated with an unducted fan propulsor, rather than addressed directly, may instead be offset by placing the engine at a more optimal location relative to the wing.

Additionally, the inventors found that the installed engine's improved position also positively influences the noise produced by the wing-engine interaction during flight at cruise conditions.

The inventors surprisingly found that by adapting a particular location on an unducted fan propulsor relative to an aircraft wing's effective quarter chord point (QC), the desired result of offsetting interference and scrubbing drag without increasing the power delivered to the fan could be achieved for an unducted fan propulsor.

The inventors also found that the improved position is dependent on the fan blade size of the unducted fan propulsor.

As explained below, after recognizing the novel flow characteristics associated with an unducted fan propulsor installed on an aircraft, taking into account the limitations on where to place this propulsor, the inventors were surprisingly able to establish criteria for positioning the propulsor relative to an aircraft wing to offset interference and scrubbing effects by defining a midpoint (P) location between external output guide vanes (OGV) or input guide vanes (IGV) and a forward or aft rotating array of fan blades, respectively, and additionally defining the distance from the effective quarter chord point (QC) to P. The position of P relative to QC and QC itself were found dependent on the rotating fan diameter. The correlation of these parameters to offset interference and scrubbing effects was not used before and was the surprising finding of the inventors for an unducted fan propulsor. Thus, mounting unducted fan propulsors relative to the effective quarter-chord point (QC) and fan blade size as described in embodiments provided herein offsets interference and scrubbing effects associated with an unducted fan propulsor and is an improvement over other mounting locations, including conventional mounting locations that are more forward of, and more in line with, a wing chord line.

Various aspects of the present disclosure describe aspects of an aircraft characterized in part by a specific relation between an effective quarter chord point (QC) of an airfoil section associated with a wing (or horizontal stabilizer) and the unducted fan propulsor, which is believed to result in improved aircraft performance and/or fuel efficiency. According to the disclosure, an aircraft includes a fuselage and an unducted fan propulsor installed relative to a section of the wing or the horizontal stabilizer.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Figure 1:
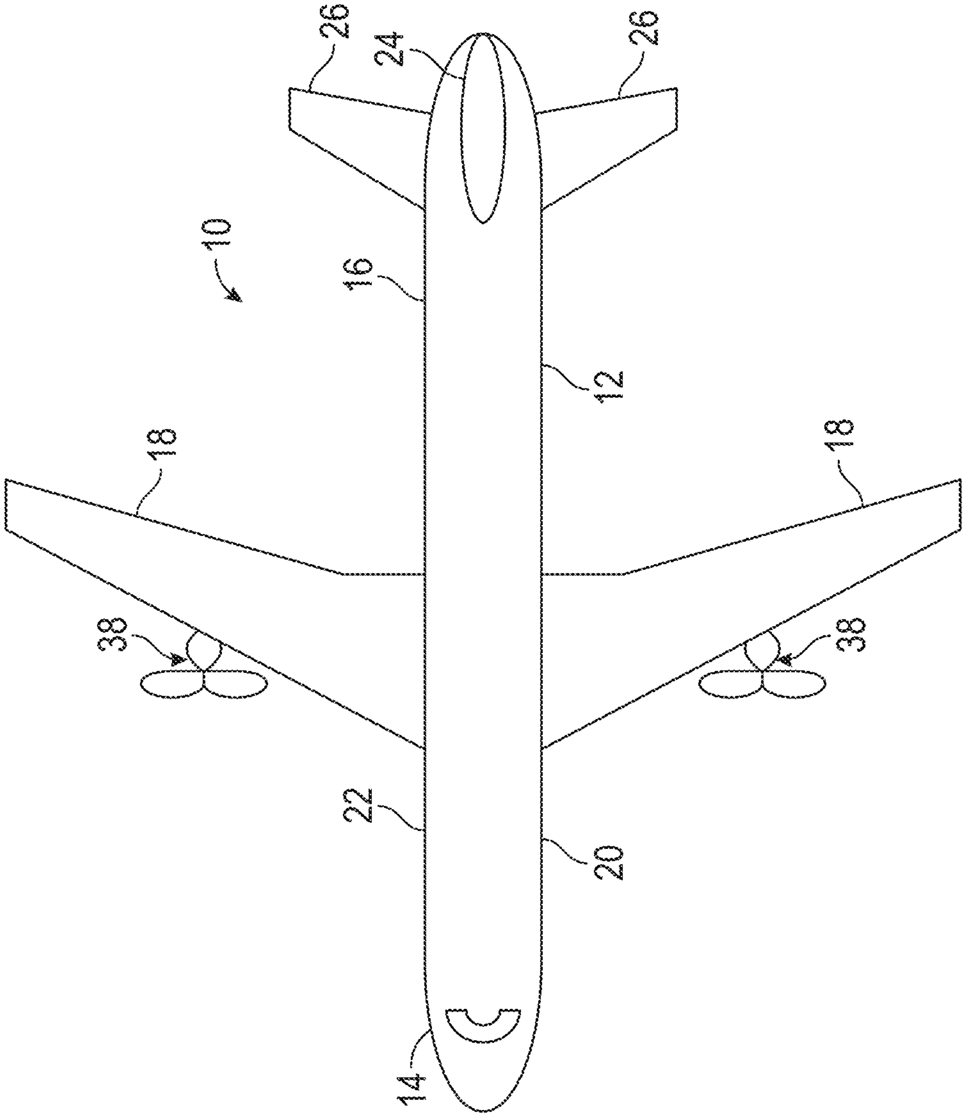
FIG. 1 comprises a top plan view of an aircraft as configured in accordance with various embodiments of these teachings, with undermounted, unducted fan propulsors mounted on forward wings of the aircraft.
Figure 2:
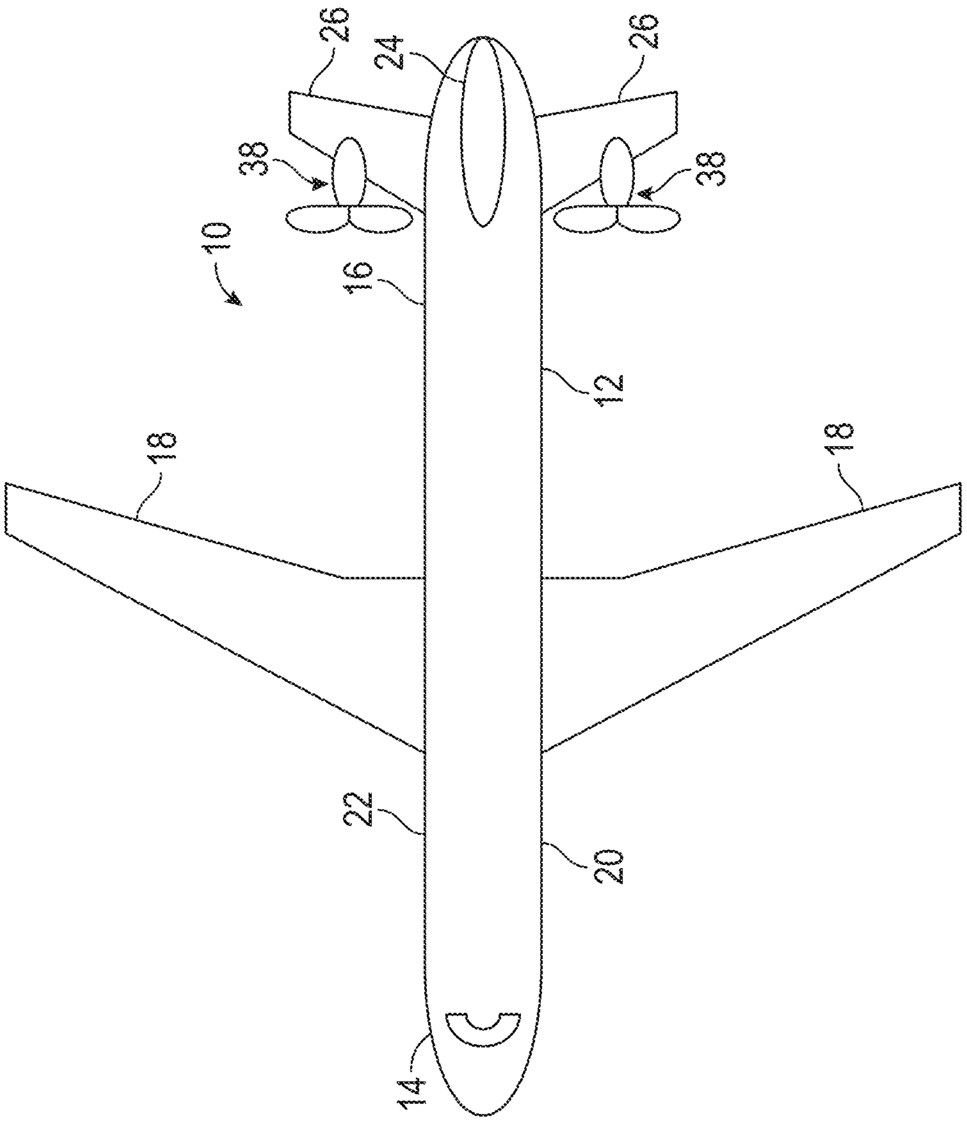
FIG. 2 comprises a top plan view of an aircraft as configured in accordance with various embodiments of these teachings, with unducted fan propulsors mounted on top of horizontal stabilizers of the aircraft.

As shown in FIGS. 1 and 2, the aircraft 10 includes a fuselage 12 that extends longitudinally from a forward or nose section 14 and an aft or tail section 16 of the aircraft 10. The aircraft 10 further includes airfoils including a first wing 18 that extends laterally outwardly from a port side 20 and a second wing 18 that extends laterally outwardly from a starboard side 22 of the fuselage 12. The tail section 16 of the aircraft 10 includes a vertical stabilizer 24, a first airfoil of the horizontal stabilizer 26 that extends laterally outwardly from the port side 20, and a second airfoil of the horizontal stabilizer 26 that extends laterally outward from the starboard side 22 of the fuselage 12. A turbine engine, also referred to as an unducted fan propulsor 38, is undermounted relative to each of the wings 18, as shown in the embodiment of FIG. 1. Alternatively, the unducted fan propulsor 38 is mounted relative to the top of each of the horizontal stabilizers 26, as shown in FIG. 2. In some embodiments, more than one of the unducted fan propulsors 38 may be mounted to each of the wings 18 or each of the horizontal stabilizers 26.

FIG. 3 shows an elevational cross-sectional view of an embodiment of one of the unducted fan propulsors 38. As is seen from FIG. 3, the unducted fan propulsor 38 takes the form of an open fan propulsion system and has a rotating element in the form of a propeller assembly, also referred to as a fan assembly 32, on which is mounted a first array of blades 34 around a centerline (CL) of the unducted fan propulsor 38. The first array of blades 34 defines a diameter D representing the tip-to-tip diameter of the blades and a maximum radial extent from CL. This diameter D is measured along a radial direction perpendicular to CL. The unducted fan propulsor 38 of FIG. 3 includes a second array of blades or vanes, which are non-rotating or static. In some embodiments, a non-rotating stationary element in the form of the vane assembly 40 includes an array of blades 42 disposed around CL.

Each of the blades 34 has a root 35 where the blade 34 is attached to the fan assembly 32, and each blade 34 defines a root length (RTL). The root length (RTL) is defined as the axial extent (in a direction parallel to CL) from the radially innermost leading edge (LE) 37 of the blade 34 airfoil, e.g., closest to CL, to the axial location of the radially innermost trailing edge (TE) of the blade 34 airfoil.

Figure 4:
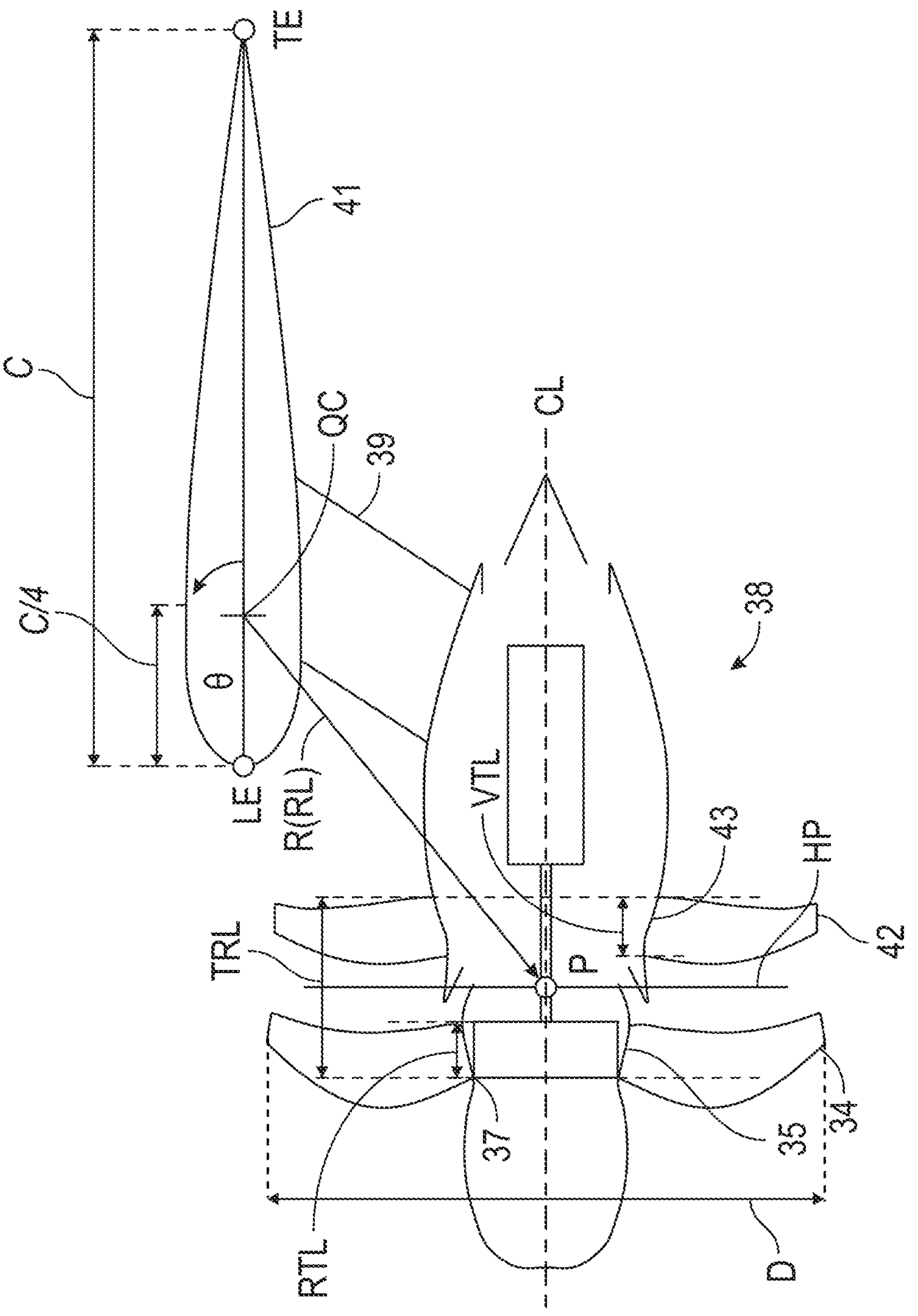
FIG. 4 comprises a schematic side elevation view showing the location of the unducted fan propulsor of FIG. 3 relative to an airfoil section.

Each of the blades 42 also has a root 43 with a vane root distance VTL where the blade 42 is attached to the vane assembly 40 (e.g., non-rotating). The total root length (TRL) is the distance between the leading edge (LE) of the blade 34 airfoil (radially nearest to CL) of the blades 34 and the trailing edge (LE) of the root 43 of the blades 42, as shown in FIGS. 3 and 4. TRL is a measured axial distance from the radial innermost LE of the foremost row of blades/vanes and the trailing edge (TE) of the blades 42. In some embodiments, the second array may instead be a second rotating elements and the TRL is the measured axial distance from the radially innermost LE of the blades 34 of the first rotating element and the TE of the root of the blades of the second rotating elements. In some embodiments, the blades 42 may be forward of the rotating blades, and the TRL is the distance between the LE edge of the root of the vanes and the TE of the root of the rotating blades. In some embodiments, an unducted fan propulsor having rotating elements (e.g., rotating blades) and stationary elements (e.g. vanes) may be mounted according to the relationship described in the present disclosure. In unducted fan propulsors having multiple rows of blade and/or vanes, the TRL of an unducted fan propulsor is defined as the distance between the LE of the root of the foremost row of blades/vanes and the rearward edge of the root of the aftmost row of blades/vanes of the unducted fan propulsor.

Referring to FIG. 4, for purposes explained more later, the unducted fan propulsor 38 has a point P. For the unducted fan propulsor 38 with a first array of blades 34 or vanes and a second array of blades 42 or vanes, as shown in FIGS. 3 and 4, the point P is located at the intersection of CL and a line HP perpendicular to CL and that passes through an axial midpoint of the total root length TRL between a forward end at the root of one of the blades 34 of the forward array and a rearward end at the root of one of the blades 42 of the rearward array when aligned with the one of the blades 34 of the forward array, as shown in FIG. 6. Either the forward or rearward array can be vanes or blades. In other words, the line HP is located equidistant from a forward end of the root of one of the forward vanes or blades 34 and a rearward end of the root of one of the rearward blades or blades 42. The TRL of an unducted fan propulsor is defined as the distance between the LE of the root of the forward row of blades or vanes and the rearward edge of the root of the aftmost blade or vane.

Referring again to FIG. 3, the unducted fan propulsor 38 includes a drive mechanism 44 that provides torque and power to the fan assembly 32 through a transmission 46. The drive mechanism 44 may be a turbine engine and associated transmission 46. The transmission 46 delivers torque from the drive mechanism 44 to the fan assembly 32. The transmission system can be configured as a direct drive engine, transferring power from a power turbine or low-pressure turbine (LPT) to the propeller assembly, or an indirect drive system where torque from the LPT is transferred to the fan assembly 32 through a gearbox. The gearbox reduces a rotation speed of the drive shaft to match a desired rotational speed for the fan assembly 32. The turbine engine includes in serial order a compressor, a combustor, a high-pressure turbine and the LPT. In other embodiments, the drive mechanism may generate power partially or fully by an electric motor. In the former case the drive mechanism is a hybrid electric drive mechanism including a turbine engine where a drive shaft includes an electric motor-generator for generating torque. In the latter case the drive mechanism is an electric motor.

The unducted fan propulsor 38 is attached relative to the wings 18 or the horizontal stabilizer 26 through one or more intermediate components or features, e.g., a pylon 39, as shown in FIG. 4.

Each of the wings 18 shown in FIG. 1, and horizontal stabilizers 26 shown in FIG. 2, has an airfoil section 41 associated therewith, where the airfoil section 41 is defined above.

As depicted in FIG. 4, a chord line C of the airfoil section, length C as shown, is a straight line extending from LE to TE of the airfoil section (the airfoil section as shown and defined herein is not meant to indicate any particular camber associated with an aircraft wing). The effective quarter-chord point (QC) of the airfoil section is located on the chord line. QC is located at a distance of C/4 from the LE of the airfoil section 41.

Figure 5A:
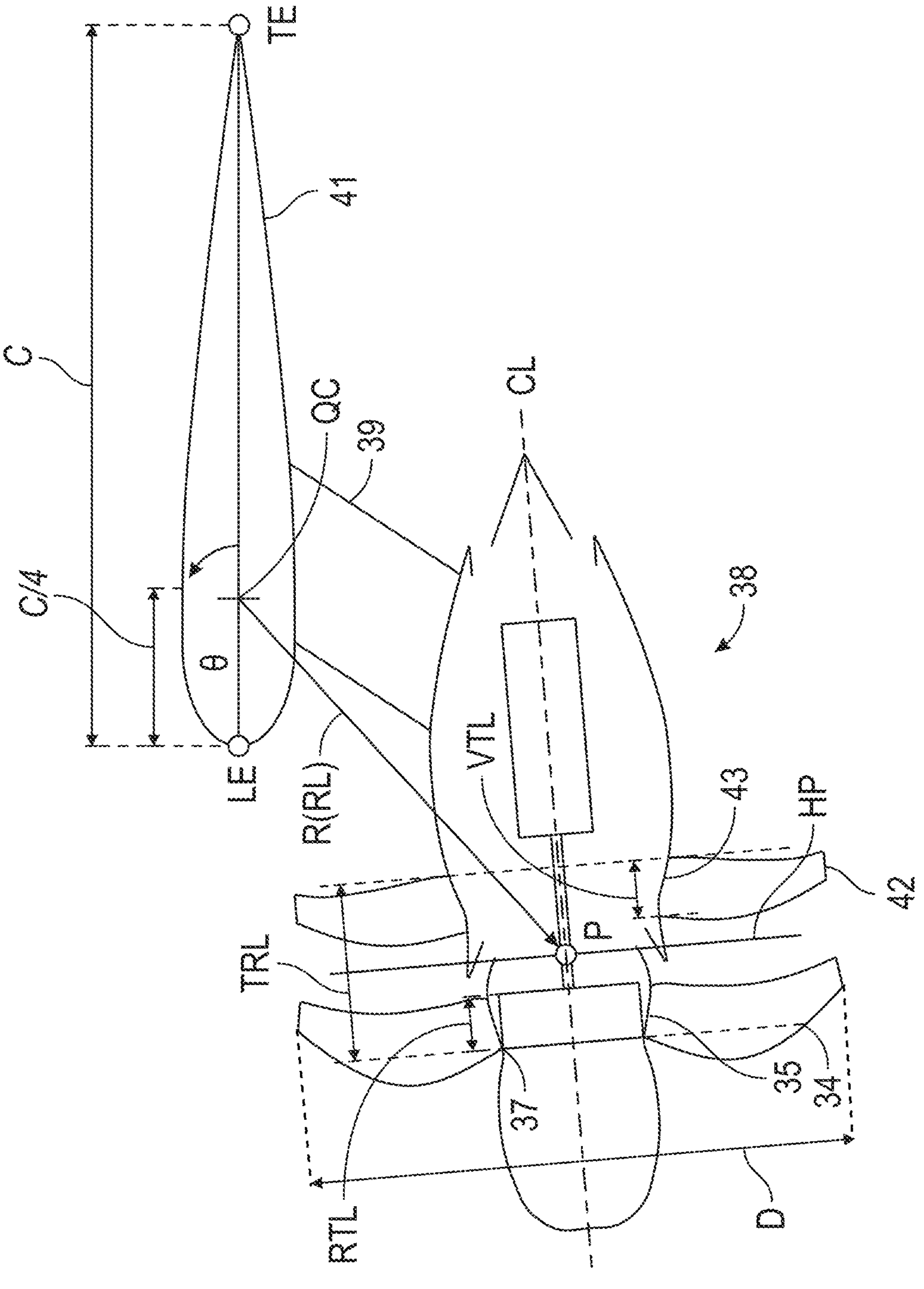
FIG. 5A is a schematic side elevation view similar to FIG. 4 and showing the unducted fan propulsor pitched downward relative to the airfoil section.
Figure 5B:
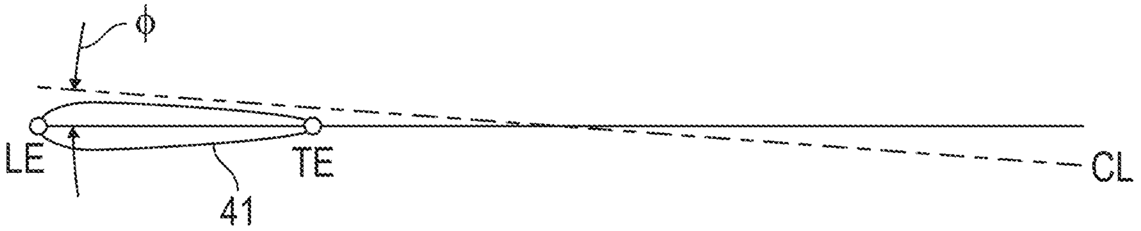
FIG. 5B defines a pitch angle $\phi$ for the unducted fan propulsor relative to a chord line of the airfoil section in FIG. 4.

As shown in FIG. 4, the CL of the unducted fan propulsor 38 and the chord line C are parallel to each other, corresponding to a zero pitch of the propulsor relative to the chord line C. The unducted fan propulsor 38 can be pitched at different angles relative to the chord line, such as pitched downward as shown in FIG. 5A. FIG. 5B defines a pitch angle $\phi$ for the propulsor 38, which is the angle spanned between the propulsor centerline CL and chord line C. Positive pitch corresponds to a clockwise rotation of CL relative to C. The pitch angle $\phi$ can be fixed or variable during flight. For underwing installations, the pitch angle $\phi$ can vary between −5 and +2 degrees, or between −3 and 0 degrees. During cruise conditions, propulsor pitch and toe angle (FIG. 6E, defined below) provide for an improved installed aerodynamic performance for the unducted fan propulsor in terms of reduced cabin noise and reduced off-axis loading of the unducted fan propulsor's drive shaft. For aft horizontal stabilizer or aft fuselage installations, the angle ϕ can vary between −2 and +5 degrees to more align with downwash created by the wing.

The position of the unducted fan propulsor 38 is defined relative to QC. The airfoil section, as defined above, is the average of a first offset plane section and a second offset plane section of the airfoil (of the wing), where the first offset plane section is the section of the airfoil taken at a first plane and the second offset plane section is the section of the airfoil taken at a second plane, the first and second planes being offset in a direction perpendicular to, and equidistant from a central plane by a distance of ½ the maximum fan diameter (D) for the rotating blades, as shown in FIG. 6A. Both the gravity vector and axis of rotation of the rotating blades of the propulsor lie in this central plane when the aircraft is on the ground.

Figure 6C:
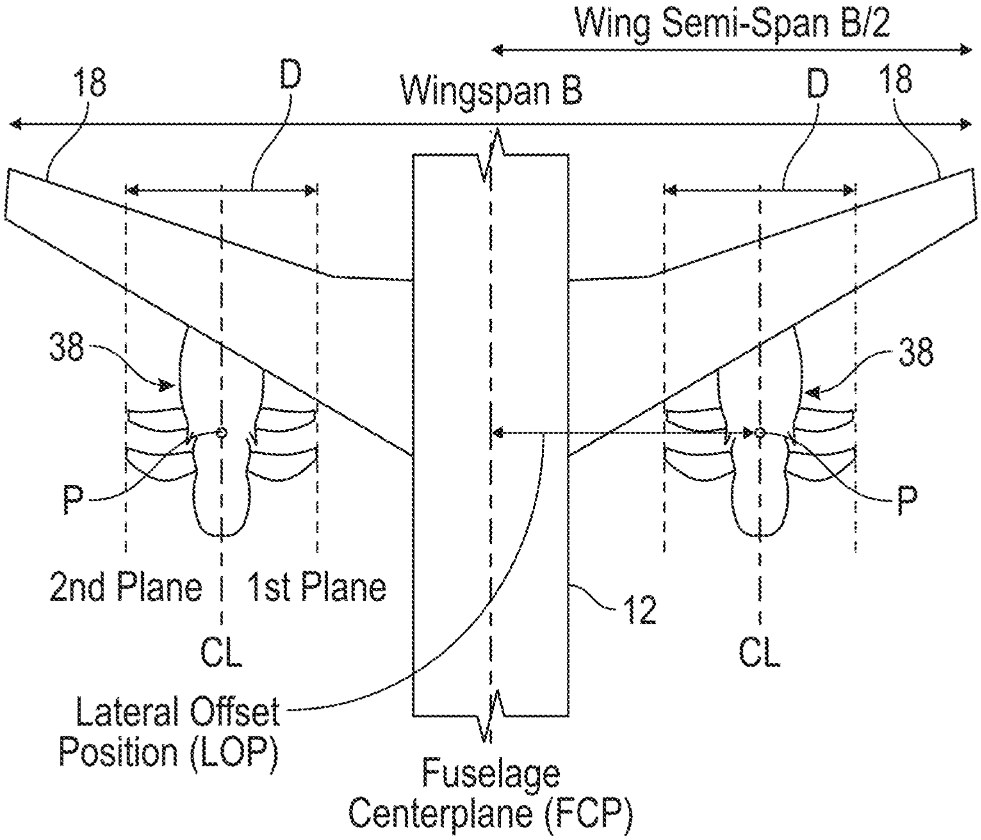
FIG. 6C comprises a schematic top plan view of a portion of an aircraft having a pair of wings extending from the fuselage with the propulsor of FIG. 3 mounted relative to each of the wings.

Referring to FIG. 6C, the propulsor 38—specifically, point P of the propulsor 38—has a spanwise location laterally offset from the fuselage centerplane (FCP) relative to the aircraft's wingspan B. P has a laterally offset position (LOP) between 10% and 80%, 20% and 40%, or between 25% and 35% of B/2 measured from the fuselage centerplane (FCP), as defined above. The location of P is also chosen to avoid interference with the fuselage or an adjacent propulsor if more than one propulsor is mounted relative to the wing. For an aft fuselage installation, the LOP of the propulsor will be closer to the fuselage, but far enough away from the fuselage's boundary layer to reduce or avoid undue interaction with the fuselage boundary layer.

Figure 6D:
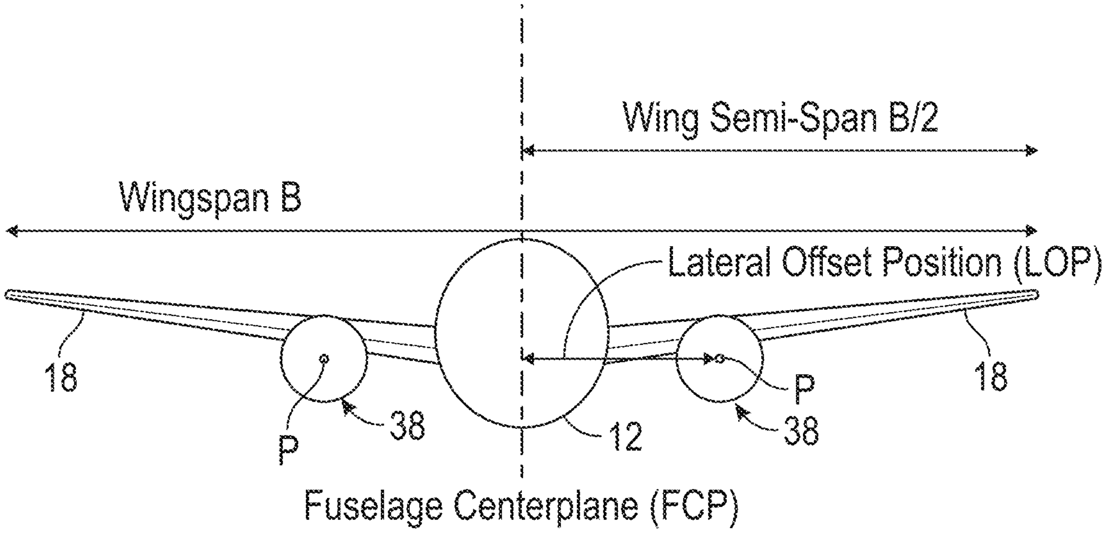
FIG. 6D comprises a schematic front elevation view of the aircraft portion of FIG. 6C.
Figure 6E:
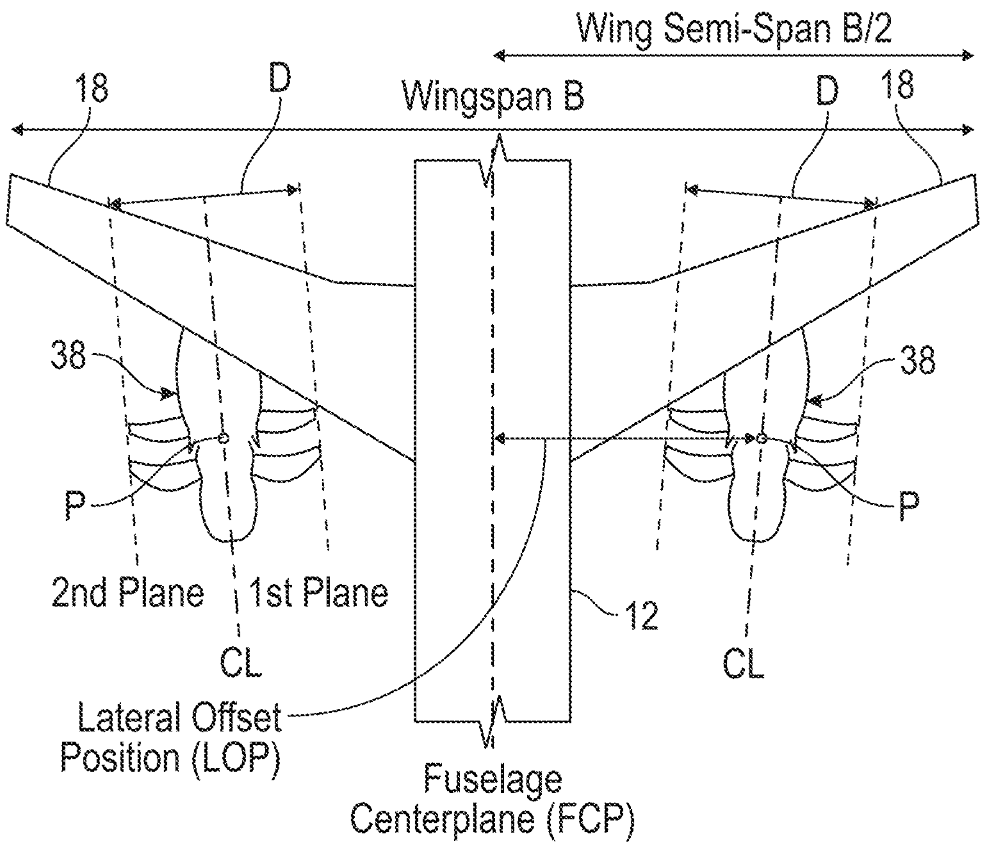
FIG. 6E comprises a schematic top plan view of a portion of an aircraft having a pair of wings extending from the fuselage with the propulsor of FIG. 3 mounted relative to each of the wings, similar to FIG. 6C but showing the propulsors toed inwardly toward the fuselage.

As shown in FIG. 6C, the propulsor centerline CL and the fuselage centerplane (FCP) can be orientated parallel to each other. Referring to FIG. 6D, other angles between propulsor centerline CL and the fuselage centerplane (FCP) are contemplated. For an underwing mounted propulsor, the toe angle can provide added benefit when positive (i.e., the rotor toed-in towards the fuselage with the forward end of the unducted fan propulsor 38 being more inboard than the aft end). The propulsor can have an inward toe angle of between 0 and 5 degrees, or between 1 and 3 degrees.

There are specific locations that the inventors have found to be advantageous to position the unducted fan propulsor 38 to generate increased thrust using higher pressure air flow, in order to offset the scrubbing and interference drag. The higher pressure air flow can be beneath the wings 18. In the case of a horizontal stabilizer 26, the higher pressure air flow is above the horizontal stabilizer 26. Accordingly, the high-pressure side of an airfoil may refer to the underside of a wing 18 or the top side of a horizontal stabilizer 26.

The aircraft described herein has a fuselage, wings and/or stabilizers, and two or more unducted fan propulsor systems (or propulsors). The unducted fan propulsor system, which is mounted on the pressure side of a wing or horizontal stabilizer, provides thrust to the aircraft. To improve upon what the propulsor system can deliver, there often is a need to make compromises to other parts of aircraft design (trade-offs). Stated another way, the benefits of an unducted fan propulsor cannot be viewed without consideration of the effect of placement of the propulsor on the aircraft. For example, placement can affect loads on and size of the pylon, wing loads, landing gear length and associated forces, weight, and cost.

The teachings described below enable improved balancing of the tradeoffs required in the aircraft design while positioning the unducted fan propulsor relative to the airfoil section's effective quarter chord point QC to offset scrubbing and interference drag loses.

Referring to FIG. 4, the location of an unducted fan propulsor relative to an airfoil section 41 is defined herein using a polar coordinate system having an angular (θ) coordinate and a radial (R) component, with origin located at the effective quarter chord point (QC) of the airfoil section having a chord length (C) as shown. The radial component is referred to herein as a "positioning line (R)". The location of the point P of the unducted fan propulsor 38 relative to the origin (QC) of the polar coordinate system (the origin of the coordinate system is the same as the effective quarter chord point for airfoil section 41) is expressed in terms of a vector having radial component R with magnitude RL and angular component θ. The vector magnitude RL is called a "positioning line length (RL)".

The angle θ is measured relative to a datum that is the airfoil section chord line (e.g., in FIG. 6 the vector R is located by an angle that is between 180 and 270 degrees measured counterclockwise about origin QC relative to the chord line). When viewed looking from an outboard position towards an inboard position (e.g., the fuselage), θ is positive in a counter-clockwise direction when the propulsor is below the airfoil section 41 (wing, FIG. 9), and θ is positive in a clockwise direction when the propulsor is above the airfoil section (horizontal stabilizer, FIG. 10) as indicated in the drawings, respectively, by the direction of the arrow from the origin.

The inventors found that for an unducted fan propulsor system the ratio of RL over D (i.e., RL/D) is desirably less than or equal to 2, less than or equal to 2 and greater than or equal to 0.15, or less than or equal to 2 and greater than or equal to 0.35. Additionally, for the undermounted unducted fan propulsor systems (pressure side of the airfoil section) of FIGS. 5 and 6 the angular component θ associated with these ranges for RL/D and locating the unducted fan propulsor system (i.e., the location of P relative to the airfoil section) are desirably between 187° and 342°, between 198° and 310°, or between 205° and 285°. These regions of RL and θ locating the unducted fan propulsor system relative to the airfoil section tend to offset scrubbing and interference drag for an unducted fan propulsor.

Figure 9:
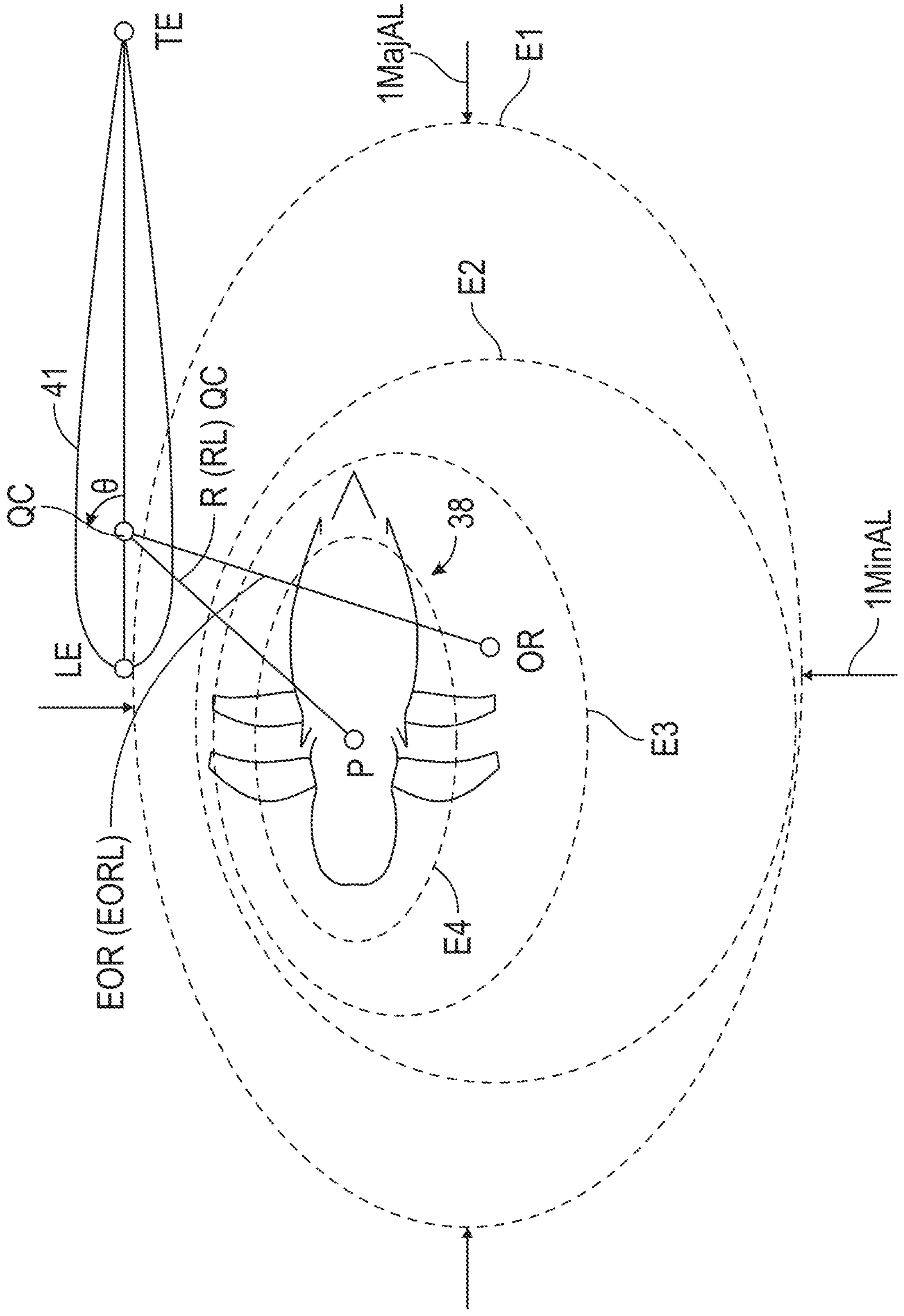
FIG. 9 comprises a schematic side elevation view similar to that of FIG. 7, showing the first ellipse, the second ellipse, the third ellipse, and the fourth ellipse to illustrate various embodiments of mounting locations of one of the unducted fan propulsors relative to one of the wings.
Figure 10:
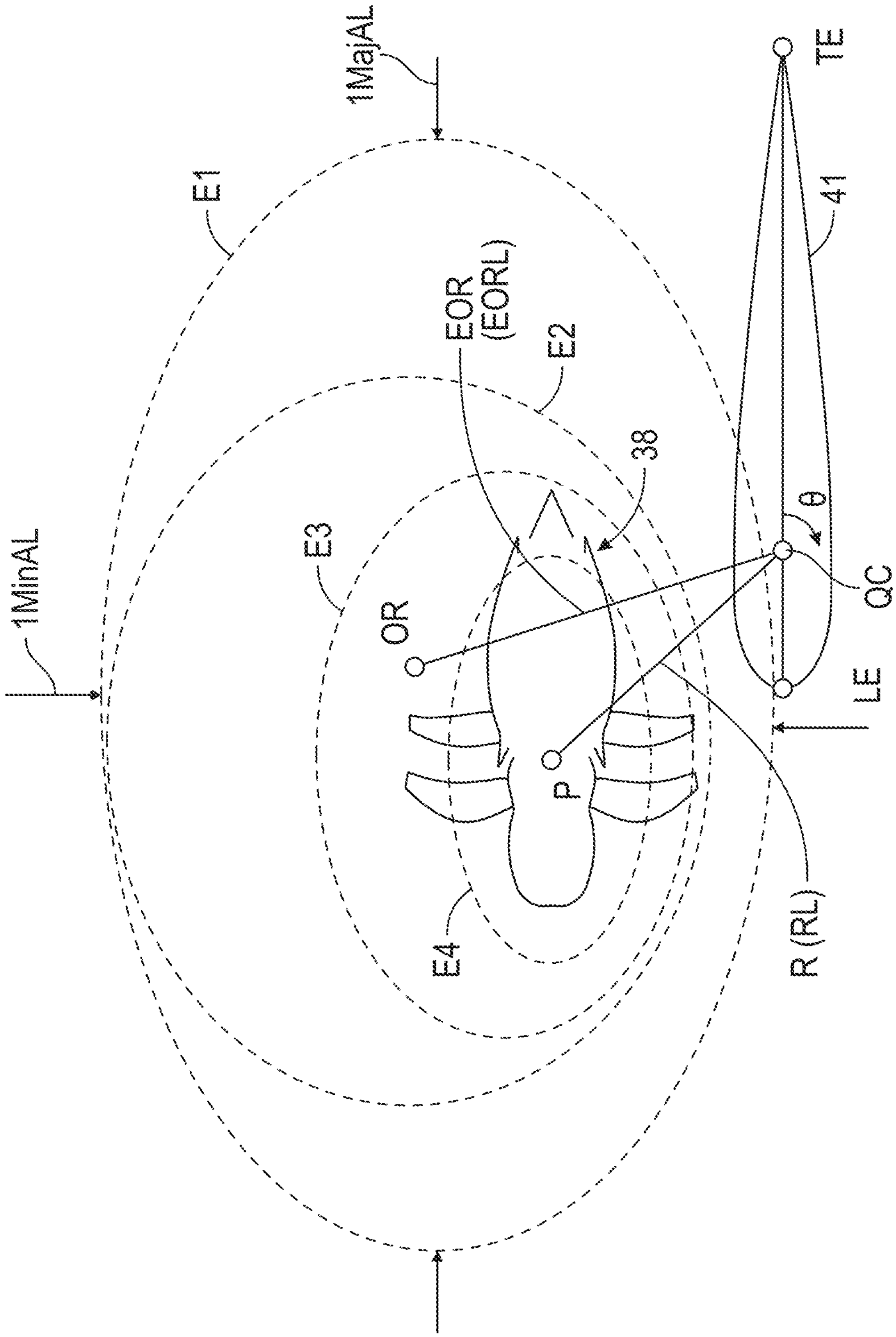
FIG. 10 comprises a schematic side elevation view similar to that of FIG. 8, showing the first ellipse, the second ellipse, the third ellipse, and the fourth ellipse to illustrate various embodiments of mounting locations of one of the unducted fan propulsors relative to one of the horizontal stabilizers.

Alternatively, the point P for the unducted fan propulsor can be located within a defined ellipse defining a region relative to QC where scrubbing and interference drag tends to offset. FIGS. 7 to 10 each illustrate such ellipses according to several embodiments. Each of the ellipses has an origin OR, a major axis length (MajAL), and a minor axis length (MinAL), as shown in FIGS. 9 and 10 with respect to one of several ellipses and as will be explained further below. The location of OR is expressed relative to QC using the polar coordinate system frame of reference defined earlier. The propulsor system is mounted such that the point P of the unducted fan propulsors 38 is located within an ellipse as defined herein.

Referring to FIG. 9, the radial ellipse origin positioning line (EOR) extends from the ellipse origin OR, e.g., ellipse E1, to QC. The ellipse origin position line EOR has a length EORL. The origin of each of the ellipses is defined in the adopted polar coordinates with a radial coordinate defined as the ratio of EORL to the array of blades diameter (D), i.e., the quantity EORL/D. The angle θ is measured relative to the chord line (as defined earlier) and positive in a clockwise direction when the propulsor is above the airfoil section (horizontal stabilizer, FIG. 10) as indicated in the drawings, respectively, by the direction of the arrow from the origin.

An angle θ for the ellipse origin positioning line EOR is measured from a datum that is the chord line to an ellipse positioning line EOR (e.g., in FIG. 9 the vector EOR is located by an angle that is between 180 and 270 degrees measured counterclockwise about origin QC). A positive θ (1) increases in a counter-clockwise direction when the high pressure side of the airfoil section is below the airfoil section, and (2) increases in a clockwise direction when the high pressure side of the airfoil section is above the airfoil section.

In a first embodiment, the point P of the unducted fan propulsor 38 is located in a first ellipse E1 with a first ellipse origin defined by EORL/D of 0.938 and θ of 253.6°. The first ellipse E1 also has a first major axis length (1 MajAL) and a first minor axis length (1 MinAL), where 1 MajAL/D is 2.8 and 1 MinAL/D is 1.7. A unducted fan propulsor located within E1 tends to offset scrubbing and interference drag.

In a second embodiment, the point P of the unducted fan propulsor 38 is located in a second ellipse E2 having a second ellipse origin defined by EORL/D of 1.051 and θ of 248.8°. The second ellipse E2 has a second major axis length (2 MajAL) and a second minor axis length (2 MinAL), where 2 MajAL/D is 1.86 and 2 MinAL/D is 1.56. An unducted fan propulsor located within E2 tends to offset scrubbing and interference drag.

In a third embodiment, the point P of the unducted fan propulsor 38 is located in a third ellipse E3 having a third ellipse origin defined by EORL/D of 0.870 and θ of 239.6°. The third ellipse E3 has a third major axis length (3 MajAL) and a third minor axis length (3 MinAL), where 3 MajAL/D is 1.4 and 3 MinAL/D is 0.9. An unducted fan propulsor located within E3 tends to offset scrubbing and interference drag.

In a fourth embodiment, the point P of the unducted fan propulsor 38 is located in a fourth ellipse E4 having a fourth ellipse origin defined by EORL/D of 0.763 and θ of 235.7°. The fourth ellipse E4 has a fourth major axis length (4 MajAL) and a fourth minor axis length (4 MinAL), where 4 MajAL/D is 0.94 and 4 MinAL/D is 0.44. An unducted fan propulsor located within E4 tends to offset scrubbing and interference drag.

The location of the unducted fan propulsor system (i.e., point P) relative to the airfoil section may also be expressed in terms of the following expressions:

$$\frac{RL}{D}+\frac{\left(\sqrt{\left(a*\left[b*\sin^2(\theta)-c*\cos^2(\theta)+d*\sin(\theta)*\cos(\theta)\right]\right)}+e*\sin(\theta)+f*\cos(\theta)\right)}{g*\sin^2(\theta)+h*\cos^2(\theta)}>0$$

and $$\frac{RL}{D}+\frac{\left(-\sqrt{\left(a*\left[b*\sin^2(\theta)-c*\cos^2(\theta)+d*\sin(\theta)*\cos(\theta)\right]\right)}+e*\sin(\theta)+f*\cos(\theta)\right)}{g*\sin^2(\theta)+h*\cos^2(\theta)}<0$$

where 0.07<RL/D<1.98 and θ is between 187° and 340°, and where a, b, c, d, e, f, g and h have the values set forth in the following table under the heading "Fifth Emb.":

| Variable | Fifth Emb. | Sixth Emb. | Seventh Emb. | Eighth Emb. |
|---|---|---|---|---|
| a | 1.4161 | 0.52621 | 0.09923 | 0.01069156 |
| b | 1.88978 | 0.7205 | 0.2964 | 0.036 |
| c | 0.0875 | 0.352 | 0.36 | 0.3485 |
| d | 0.477 | 0.7448 | 0.66 | 0.5418 |
| e | 1.764 | 0.8476 | 0.3675 | 0.139167 |
| f | 0.19146 | 0.23119 | 0.0891 | 0.020812 |

-continued

| Variable | Fifth Emb. | Sixth Emb. | Seventh Emb. | Eighth Emb. |
|---|---|---|---|---|
| g | 1.96 | 0.8649 | 0.49 | 0.2209 |
| h | 0.7225 | 0.6084 | 0.2025 | 0.0484 |

In a sixth embodiment, the point P of the unducted fan propulsor 38 can be defined by the above expression, but where 0.254<RL/D<1.86 and θ is between 199° and 306°, and where a, b, c, d, e, f, g and h have the values set forth in the above table under the heading "Sixth Emb."

In a seventh embodiment, the point P of the unducted fan propulsor 38 can be defined by the above expression, but where 0.369<RL/D<1.43 and θ is between 204° and 291°, and where a, b, c, d, e, f, g and h have the values set forth in the above table under the heading "Seventh Emb.".

In an eighth embodiment, the point P of the unducted fan propulsor 38 can be defined by the above expression, but where 0.477<RL/D<0.9455 and θ is between 211° and 274°, And where a, b, c, d, e, f, g and h have the values set forth in the above table under the heading "Eighth Emb."

Figure 7:
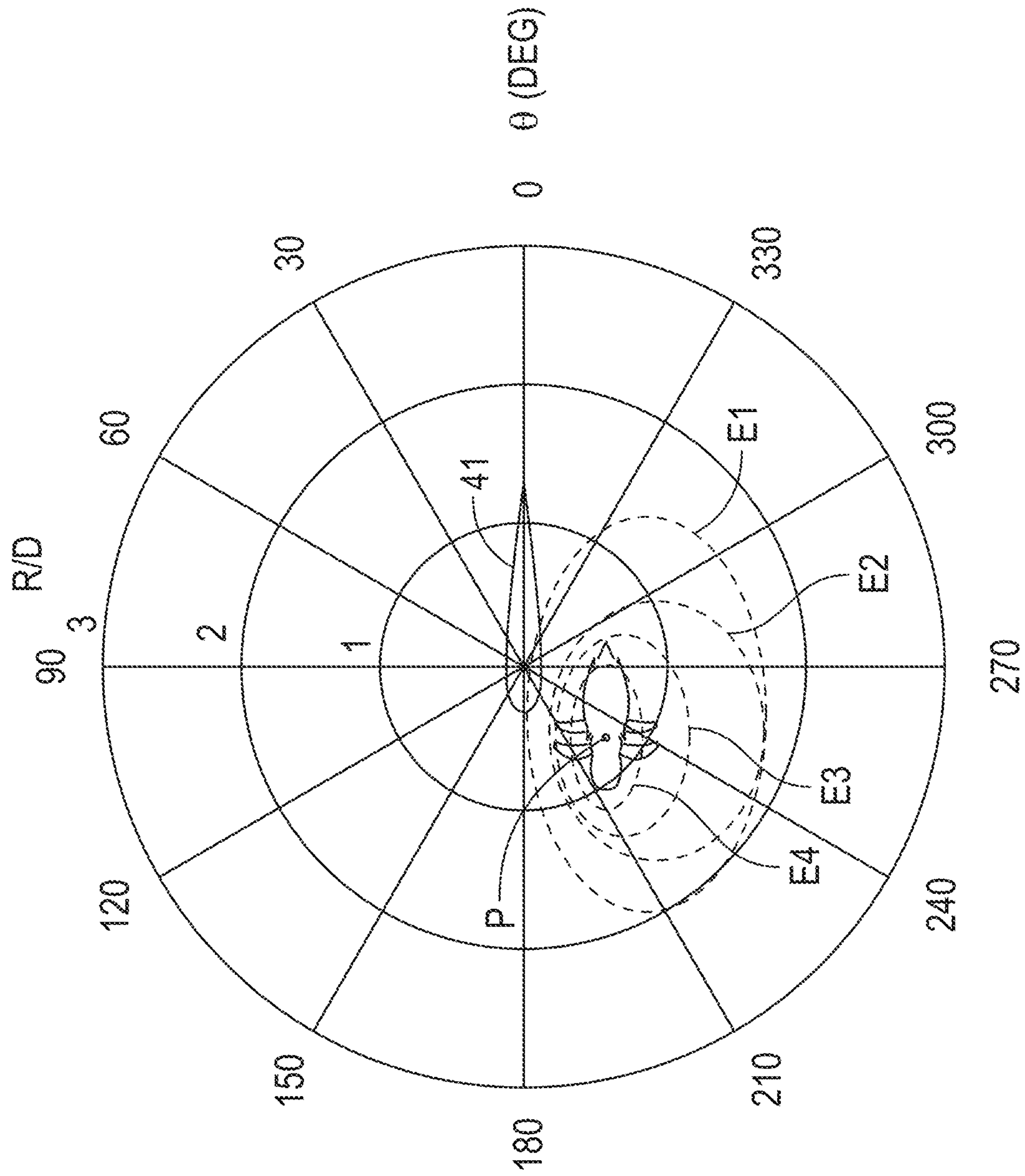
FIG. 7 comprises a schematic side elevation view similar to that of FIG. 4, but showing a first ellipse, a second ellipse, a third ellipse, and a fourth ellipse to illustrate various embodiments of mounting locations of one of the unducted fan propulsors relative to one of the wings.

The unducted fan propulsor locations illustrated in FIG. 7 are made relative to an airfoil section of an aircraft wing and refer to an undermounted unducted fan propulsor system.

Figure 11:
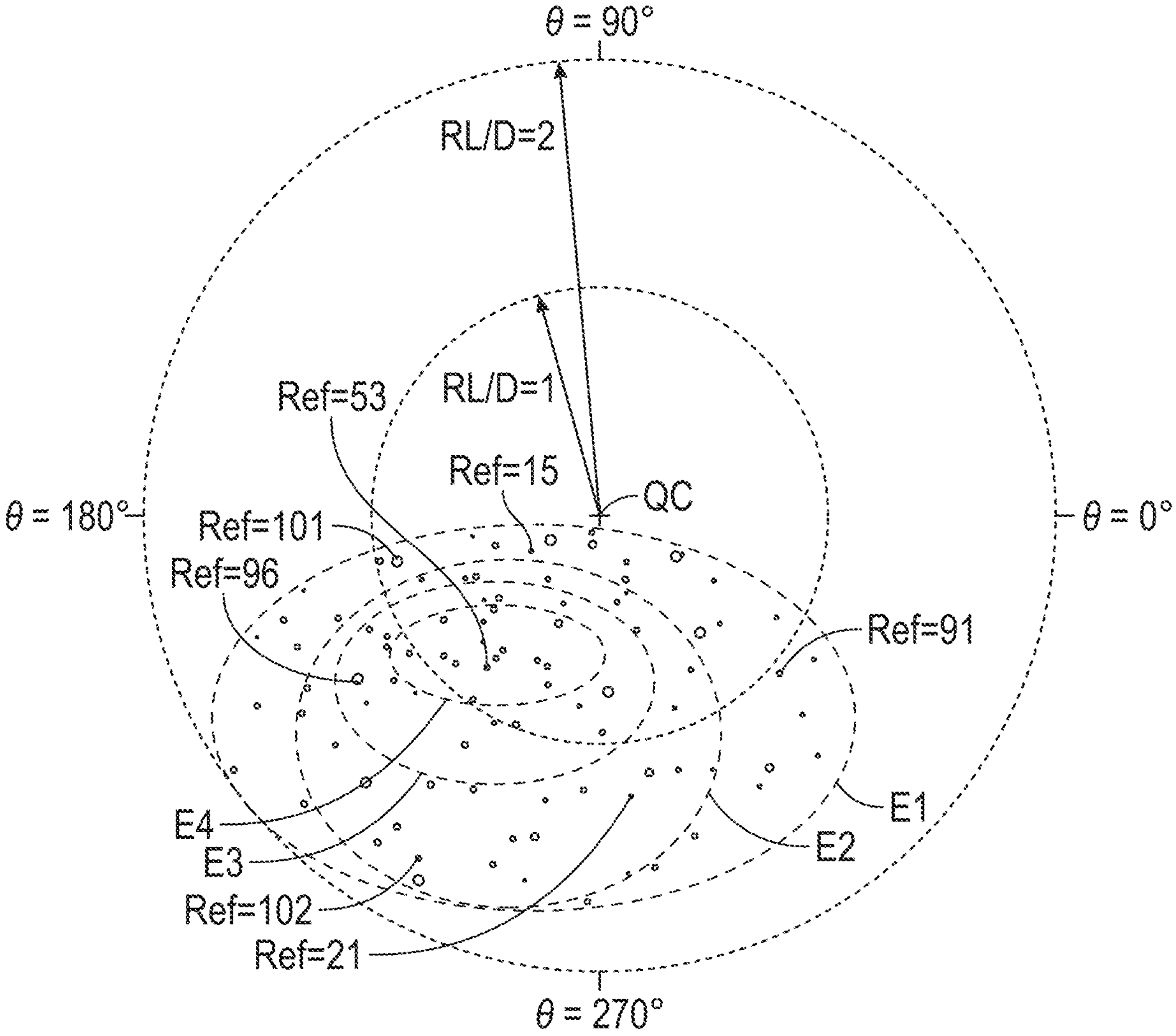
FIG. 11 comprises a schematic representation showing exemplary locations of a point P of one of the unducted fan propulsors, as defined herein, within the first ellipse, the second ellipse, the third ellipse, and the fourth ellipse.

TABLES 1 and 3 to 6 set forth examples of embodiments of invention. TABLE 1 shows each maximum outer diameter (D) and the location of point P of the unducted fan propulsor relative to the effective quarter chord point, QC, contemplated, where the point P is defined by RL and θ. The term "Ref." refers to the row in Table 1 for reference. The exemplary types of aircraft indicated with reference letters A through I in TABLE 1 are identified in TABLE 2. The point P of the unducted fan propulsor locations from TABLE 1 are shown in FIG. 11 for an under-wing mounted propulsor (for a propulsor mounted above a horizontal stabilizer the maximum outer diameter (D) and the point P of the unducted fan propulsor locations would be mirrored about the chord line of the airfoil section, which, for purposes of explanation, may be thought of as an axis passing through θ=0 deg and θ=180 deg in FIG. 11) relative to the first ellipse (E1), second ellipse (E2), third ellipse (E3), and the fourth ellipse (E4). The size of the points in FIG. 11 represent the relative size of D for the range provided in TABLE 1 (not to scale). The rotating blades diameter (D) may be between 2 to 50, 8 to 16, 10 to 15, 12 to 14, or 14 to 16 feet.

TABLE 1

P-location relative to airfoil section quarter chord point

| Ref. | Type of aircraft | RL | D | θ (deg) | RL/D |
|---|---|---|---|---|---|
| 1 | C I | 2.60 | 2.0 | 220.00 | 1.30 |
| 2 | F I | 1.07 | 2.0 | 189.00 | 0.54 |

TABLE 1-continued

| Ref. | Type of aircraft | RL | D | θ (deg) | RL/D |
|---|---|---|---|---|---|
| | P-location relative to airfoil section quarter chord point | | | | |
| 3 | I | 3.13 | 2.0 | 199.73 | 1.57 |
| 4 | C F I | 2.18 | 3.0 | 319.20 | 0.73 |
| 5 | F I | 2.82 | 3.0 | 242.40 | 0.94 |
| 6 | C I | 1.47 | 4.0 | 293.60 | 0.37 |
| 7 | C I | 2.43 | 4.0 | 217.87 | 0.61 |
| 8 | I | 6.64 | 4.0 | 259.47 | 1.66 |
| 9 | C F I | 4.23 | 5.0 | 265.87 | 0.85 |
| 10 | C H I | 6.57 | 5.0 | 194.40 | 1.31 |
| 11 | F I | 2.03 | 5.0 | 250.93 | 0.41 |
| 12 | C F H I | 8.03 | 5.0 | 275.47 | 1.61 |
| 13 | C | 2.52 | 6.0 | 337.33 | 0.42 |
| 14 | H | 4.44 | 6.0 | 228.53 | 0.74 |
| 15 | C I | 1.88 | 6.0 | 208.27 | 0.31 |
| 16 | C F | 7.14 | 7.0 | 244.53 | 1.02 |
| 17 | B F H | 4.15 | 7.0 | 332.00 | 0.59 |
| 18 | B C I | 6.49 | 7.0 | 292.53 | 0.93 |
| 19 | C G | 8.05 | 8.0 | 216.80 | 1.01 |
| 20 | B F I | 11.89 | 8.0 | 256.27 | 1.49 |
| 21 | C G H | 10.08 | 8.0 | 277.60 | 1.26 |
| 22 | B C G I | 7.31 | 8.0 | 330.93 | 0.91 |
| 23 | C H | 9.97 | 8.0 | 294.67 | 1.25 |
| 24 | G I | 11.57 | 8.0 | 312.80 | 1.45 |
| 25 | B F I | 11.58 | 9.0 | 260.53 | 1.29 |
| 26 | C H | 6.06 | 9.0 | 224.27 | 0.67 |
| 27 | F G H | 3.06 | 9.0 | 233.87 | 0.34 |
| 28 | C I | 12.78 | 9.0 | 204.00 | 1.42 |
| 29 | B H | 10.47 | 10.0 | 210.40 | 1.05 |
| 30 | B I | 5.53 | 10.0 | 221.07 | 0.55 |
| 31 | A B C F G H | 7.00 | 10.0 | 253.07 | 0.70 |
| 32 | I | 2.47 | 10.0 | 306.40 | 0.25 |
| 33 | A C | 15.27 | 10.0 | 222.13 | 1.53 |
| 34 | G | 11.67 | 10.0 | 241.33 | 1.17 |
| 35 | A C F H | 17.13 | 10.0 | 243.47 | 1.71 |
| 36 | A B G I | 18.70 | 11.0 | 210.00 | 1.70 |
| 37 | G | 10.93 | 11.0 | 249.87 | 0.99 |
| 38 | A H | 4.33 | 11.0 | 285.07 | 0.39 |
| 39 | F I | 6.82 | 11.0 | 206.13 | 0.62 |
| 40 | A F H | 11.60 | 12.0 | 272.27 | 0.97 |
| 41 | A B F I | 10.64 | 12.0 | 227.47 | 0.89 |
| 42 | A H | 21.84 | 12.0 | 232.80 | 1.82 |
| 43 | A G | 8.56 | 12.0 | 236.00 | 0.71 |
| 44 | B F H | 0.78 | 12.0 | 263.50 | 0.07 |
| 45 | A F | 10.00 | 12.5 | 200.00 | 0.80 |
| 46 | A B G H I | 15.25 | 12.5 | 268.00 | 1.22 |
| 47 | B | 19.92 | 12.5 | 279.73 | 1.59 |
| 48 | A B F | 15.92 | 12.5 | 316.00 | 1.27 |
| 49 | A B | 6.25 | 12.5 | 270.13 | 0.50 |
| 50 | A F H | 18.42 | 12.5 | 211.47 | 1.47 |
| 51 | F G | 24.25 | 12.5 | 215.73 | 1.94 |
| 52 | A B H | 19.50 | 13.0 | 287.20 | 1.50 |
| 53 | H | 10.66 | 13.0 | 234.93 | 0.82 |
| 54 | B | 14.99 | 13.0 | 326.67 | 1.15 |
| 55 | I | 18.11 | 13.0 | 239.20 | 1.39 |
| 56 | A B F H | 23.49 | 13.0 | 225.33 | 1.81 |
| 57 | A F G H | 10.49 | 13.0 | 302.13 | 0.81 |
| 58 | B I | 3.38 | 13.0 | 231.73 | 0.26 |
| 59 | A B G | 13.95 | 13.0 | 212.53 | 1.07 |
| 60 | A B H | 10.14 | 13.0 | 255.20 | 0.78 |
| 61 | F | 10.80 | 13.5 | 215.00 | 0.80 |
| 62 | A H I | 19.35 | 13.5 | 198.67 | 1.43 |
| 63 | B F | 15.39 | 13.5 | 220.00 | 1.14 |
| 64 | A G H I | 7.83 | 13.5 | 207.20 | 0.58 |
| 65 | B H | 10.30 | 13.5 | 235.70 | 0.76 |
| 66 | A B | 23.49 | 13.5 | 237.07 | 1.74 |
| 67 | A H | 22.05 | 13.5 | 238.13 | 1.63 |
| 68 | F G | 13.08 | 13.5 | 192.00 | 0.97 |
| 69 | A B F | 6.03 | 13.5 | 195.47 | 0.45 |
| 70 | A F | 13.23 | 13.5 | 200.80 | 0.98 |
| 71 | B H | 16.89 | 14.0 | 201.87 | 1.21 |
| 72 | B I | 22.68 | 14.0 | 254.13 | 1.62 |
| 73 | A B F H | 24.17 | 14.0 | 269.07 | 1.73 |
| 74 | B E G | 19.69 | 14.0 | 301.07 | 1.41 |
| 75 | A | 12.60 | 14.0 | 223.20 | 0.90 |
| 76 | H I | 23.30 | 15.0 | 214.67 | 1.55 |
| 77 | A B E G H | 10.30 | 15.0 | 248.80 | 0.69 |
| 78 | A B E H | 17.90 | 15.0 | 288.27 | 1.19 |
| 79 | F G | 21.23 | 16.0 | 246.67 | 1.33 |
| 80 | A E | 8.64 | 16.0 | 290.40 | 0.54 |
| 81 | E G | 17.60 | 16.0 | 207.00 | 1.10 |
| 82 | A E | 25.20 | 18.0 | 230.00 | 1.40 |
| 83 | F | 19.80 | 18.0 | 225.00 | 1.10 |
| 84 | A G | 6.84 | 18.0 | 263.73 | 0.38 |
| 85 | A E | 35.64 | 18.0 | 221.00 | 1.98 |
| 86 | A E | 6.17 | 20.0 | 297.03 | 0.31 |
| 87 | F | 30.55 | 21.0 | 259.78 | 1.45 |
| 88 | A D | 10.99 | 22.0 | 252.33 | 0.50 |
| 89 | A E | 21.50 | 22.0 | 237.43 | 0.98 |
| 90 | D | 14.29 | 24.0 | 222.53 | 0.60 |
| 91 | D E | 25.75 | 24.0 | 319.38 | 1.07 |
| 92 | D E | 3.41 | 29.0 | 267.23 | 0.12 |
| 93 | D | 39.42 | 29.0 | 304.48 | 1.36 |
| 94 | E | 38.55 | 33.0 | 282.13 | 1.17 |
| 95 | D | 51.16 | 33.0 | 229.98 | 1.55 |
| 96 | D E | 44.23 | 35.0 | 215.08 | 1.26 |
| 97 | E | 24.18 | 35.0 | 311.93 | 0.69 |
| 98 | D | 8.53 | 40.0 | 207.63 | 0.21 |
| 99 | D | 31.45 | 40.0 | 274.68 | 0.79 |
| 100 | D | 18.19 | 45.0 | 334.28 | 0.40 |
| 101 | D | 42.32 | 48.0 | 192.73 | 0.88 |
| 102 | D | 90.00 | 50.0 | 244.88 | 1.80 |

TABLE 2

| Designator for TABLE 1 | Aircraft Type |
|---|---|
| A | Narrow Body, twin engine |
| B | Narrow Body, 4 engines |
| C | Narrow Body, distributed propulsors (>4 engines) |
| D | Wide Body, twin engine |
| E | Wide Body, 4 engines |
| F | Wide Body, distributed propulsors (>4 engines) |
| G | Regional Jet |
| H | Business Jet |
| I | UAV |

For Aircraft Type A, B, C and G having a Mach flight speed at cruise conditions of between 0.70 and 0.85 the fan diameter (D) is between 8 and 16 feet, or more preferably between 12 feet and 16 feet.

TABLES 3 to 6 provide exemplary embodiments for EORL and D for each of the first ellipse E1, second ellipse E2, third ellipse E3 and fourth ellipse E4, respectively, relative to the quarter chord point (QC).

TABLE 3

| First Ellipse E1 Embodiments | | | | | | | |
|---|---|---|---|---|---|---|---|
| D (ft) | θ (deg) | EORL (ft) | 1MajAL (ft) | 1MinAL (ft) | EORL/D | 1MajAL/D | 1MinAL/D |
| 2 | 253.6 | 1.876 | 5.6 | 3.4 | 0.938 | 2.8 | 1.7 |
| 3 | 253.6 | 2.814 | 8.4 | 5.1 | 0.938 | 2.8 | 1.7 |
| 4 | 253.6 | 3.752 | 11.2 | 6.8 | 0.938 | 2.8 | 1.7 |
| 5 | 253.6 | 4.69 | 14 | 8.5 | 0.938 | 2.8 | 1.7 |
| 6 | 253.6 | 5.628 | 16.8 | 10.2 | 0.938 | 2.8 | 1.7 |
| 7 | 253.6 | 6.566 | 19.6 | 11.9 | 0.938 | 2.8 | 1.7 |
| 8 | 253.6 | 7.504 | 22.4 | 13.6 | 0.938 | 2.8 | 1.7 |
| 9 | 253.6 | 8.442 | 25.2 | 15.3 | 0.938 | 2.8 | 1.7 |
| 10 | 253.6 | 9.38 | 28 | 17 | 0.938 | 2.8 | 1.7 |
| 11 | 253.6 | 10.318 | 30.8 | 18.7 | 0.938 | 2.8 | 1.7 |
| 12 | 253.6 | 11.256 | 33.6 | 20.4 | 0.938 | 2.8 | 1.7 |
| 12.5 | 253.6 | 11.725 | 35 | 21.25 | 0.938 | 2.8 | 1.7 |
| 13 | 253.6 | 12.194 | 36.4 | 22.1 | 0.938 | 2.8 | 1.7 |
| 13.5 | 253.6 | 12.663 | 37.8 | 22.95 | 0.938 | 2.8 | 1.7 |
| 14 | 253.6 | 13.132 | 39.2 | 23.8 | 0.938 | 2.8 | 1.7 |
| 15 | 253.6 | 14.07 | 42 | 25.5 | 0.938 | 2.8 | 1.7 |
| 16 | 253.6 | 15.008 | 44.8 | 27.2 | 0.938 | 2.8 | 1.7 |
| 18 | 253.6 | 16.884 | 50.4 | 30.6 | 0.938 | 2.8 | 1.7 |
| 20 | 253.6 | 18.76 | 56 | 34 | 0.938 | 2.8 | 1.7 |
| 21 | 253.6 | 19.698 | 58.8 | 35.7 | 0.938 | 2.8 | 1.7 |
| 22 | 253.6 | 20.636 | 61.6 | 37.4 | 0.938 | 2.8 | 1.7 |
| 24 | 253.6 | 22.512 | 67.2 | 40.8 | 0.938 | 2.8 | 1.7 |
| 29 | 253.6 | 27.202 | 81.2 | 49.3 | 0.938 | 2.8 | 1.7 |
| 33 | 253.6 | 30.954 | 92.4 | 56.1 | 0.938 | 2.8 | 1.7 |
| 35 | 253.6 | 32.83 | 98 | 59.5 | 0.938 | 2.8 | 1.7 |
| 40 | 253.6 | 37.52 | 112 | 68 | 0.938 | 2.8 | 1.7 |
| 45 | 253.6 | 42.21 | 126 | 76.5 | 0.938 | 2.8 | 1.7 |
| 48 | 253.6 | 45.024 | 134.4 | 81.6 | 0.938 | 2.8 | 1.7 |
| 50 | 253.6 | 46.9 | 140 | 85 | 0.938 | 2.8 | 1.7 |

TABLE 4

| Second Ellipse E2 Embodiments | | | | | | | |
|---|---|---|---|---|---|---|---|
| D (ft) | θ (deg) | EORL (ft) | 2MajAL (ft) | 2MinAL (ft) | EORL/D | 2MajAL/D | 2MinAL/D |
| 2 | 248.8 | 2.102 | 3.72 | 3.12 | 1.051 | 1.86 | 1.56 |
| 3 | 248.8 | 3.153 | 5.58 | 4.68 | 1.051 | 1.86 | 1.56 |
| 4 | 248.8 | 4.204 | 7.44 | 6.24 | 1.051 | 1.86 | 1.56 |
| 5 | 248.8 | 5.255 | 9.3 | 7.8 | 1.051 | 1.86 | 1.56 |
| 6 | 248.8 | 6.306 | 11.16 | 9.36 | 1.051 | 1.86 | 1.56 |
| 7 | 248.8 | 7.357 | 13.02 | 10.92 | 1.051 | 1.86 | 1.56 |
| 8 | 248.8 | 8.408 | 14.88 | 12.48 | 1.051 | 1.86 | 1.56 |
| 9 | 248.8 | 9.459 | 16.74 | 14.04 | 1.051 | 1.86 | 1.56 |
| 10 | 248.8 | 10.51 | 18.6 | 15.6 | 1.051 | 1.86 | 1.56 |
| 11 | 248.8 | 11.561 | 20.46 | 17.16 | 1.051 | 1.86 | 1.56 |
| 12 | 248.8 | 12.612 | 22.32 | 18.72 | 1.051 | 1.86 | 1.56 |
| 12.5 | 248.8 | 13.1375 | 23.25 | 19.5 | 1.051 | 1.86 | 1.56 |
| 13 | 248.8 | 13.663 | 24.18 | 20.28 | 1.051 | 1.86 | 1.56 |
| 13.5 | 248.8 | 14.1885 | 25.11 | 21.06 | 1.051 | 1.86 | 1.56 |
| 14 | 248.8 | 14.714 | 26.04 | 21.84 | 1.051 | 1.86 | 1.56 |
| 15 | 248.8 | 15.765 | 27.9 | 23.4 | 1.051 | 1.86 | 1.56 |
| 16 | 248.8 | 16.816 | 29.76 | 24.96 | 1.051 | 1.86 | 1.56 |
| 18 | 248.8 | 18.918 | 33.48 | 28.08 | 1.051 | 1.86 | 1.56 |
| 20 | 248.8 | 21.02 | 37.2 | 31.2 | 1.051 | 1.86 | 1.56 |
| 21 | 248.8 | 22.071 | 39.06 | 32.76 | 1.051 | 1.86 | 1.56 |
| 22 | 248.8 | 23.122 | 40.92 | 34.32 | 1.051 | 1.86 | 1.56 |
| 24 | 248.8 | 25.224 | 44.64 | 37.44 | 1.051 | 1.86 | 1.56 |
| 29 | 248.8 | 30.479 | 53.94 | 45.24 | 1.051 | 1.86 | 1.56 |
| 33 | 248.8 | 34.683 | 61.38 | 51.48 | 1.051 | 1.86 | 1.56 |
| 35 | 248.8 | 36.785 | 65.1 | 54.6 | 1.051 | 1.86 | 1.56 |
| 40 | 248.8 | 42.04 | 74.4 | 62.4 | 1.051 | 1.86 | 1.56 |
| 45 | 248.8 | 47.295 | 83.7 | 70.2 | 1.051 | 1.86 | 1.56 |
| 48 | 248.8 | 50.448 | 89.28 | 74.88 | 1.051 | 1.86 | 1.56 |
| 50 | 248.8 | 52.55 | 93 | 78 | 1.051 | 1.86 | 1.56 |

TABLE 5

| Third Ellipse E3 Embodiments | | | | | | | |
|---|---|---|---|---|---|---|---|
| D (ft) | θ (deg) | EORL (ft) | 3MajAL (ft) | 3MinAL (ft) | EORL/D | 3MajAL/D | 3MinAL/D |
| 2 | 239.6 | 1.74 | 2.8 | 1.8 | 0.87 | 1.4 | 0.9 |
| 3 | 239.6 | 2.61 | 4.2 | 2.7 | 0.87 | 1.4 | 0.9 |
| 4 | 239.6 | 3.48 | 5.6 | 3.6 | 0.87 | 1.4 | 0.9 |
| 5 | 239.6 | 4.35 | 7 | 4.5 | 0.87 | 1.4 | 0.9 |
| 6 | 239.6 | 5.22 | 8.4 | 5.4 | 0.87 | 1.4 | 0.9 |
| 7 | 239.6 | 6.09 | 9.8 | 6.3 | 0.87 | 1.4 | 0.9 |
| 8 | 239.6 | 6.96 | 11.2 | 7.2 | 0.87 | 1.4 | 0.9 |
| 9 | 239.6 | 7.83 | 12.6 | 8.1 | 0.87 | 1.4 | 0.9 |
| 10 | 239.6 | 8.7 | 14 | 9 | 0.87 | 1.4 | 0.9 |
| 11 | 239.6 | 9.57 | 15.4 | 9.9 | 0.87 | 1.4 | 0.9 |
| 12 | 239.6 | 10.44 | 16.8 | 10.8 | 0.87 | 1.4 | 0.9 |
| 12.5 | 239.6 | 10.875 | 17.5 | 11.25 | 0.87 | 1.4 | 0.9 |
| 13 | 239.6 | 11.31 | 18.2 | 11.7 | 0.87 | 1.4 | 0.9 |
| 13.5 | 239.6 | 11.745 | 18.9 | 12.15 | 0.87 | 1.4 | 0.9 |
| 14 | 239.6 | 12.18 | 19.6 | 12.6 | 0.87 | 1.4 | 0.9 |
| 15 | 239.6 | 13.05 | 21 | 13.5 | 0.87 | 1.4 | 0.9 |
| 16 | 239.6 | 13.92 | 22.4 | 14.4 | 0.87 | 1.4 | 0.9 |
| 18 | 239.6 | 15.66 | 25.2 | 16.2 | 0.87 | 1.4 | 0.9 |
| 20 | 239.6 | 17.4 | 28 | 18 | 0.87 | 1.4 | 0.9 |
| 21 | 239.6 | 18.27 | 29.4 | 18.9 | 0.87 | 1.4 | 0.9 |
| 22 | 239.6 | 19.14 | 30.8 | 19.8 | 0.87 | 1.4 | 0.9 |
| 24 | 239.6 | 20.88 | 33.6 | 21.6 | 0.87 | 1.4 | 0.9 |
| 29 | 239.6 | 25.23 | 40.6 | 26.1 | 0.87 | 1.4 | 0.9 |
| 33 | 239.6 | 28.71 | 46.2 | 29.7 | 0.87 | 1.4 | 0.9 |
| 35 | 239.6 | 30.45 | 49 | 31.5 | 0.87 | 1.4 | 0.9 |
| 40 | 239.6 | 34.8 | 56 | 36 | 0.87 | 1.4 | 0.9 |
| 45 | 239.6 | 39.15 | 63 | 40.5 | 0.87 | 1.4 | 0.9 |
| 48 | 239.6 | 41.76 | 67.2 | 43.2 | 0.87 | 1.4 | 0.9 |
| 50 | 239.6 | 43.5 | 70 | 45 | 0.87 | 1.4 | 0.9 |

TABLE 6

| Fourth Ellipse E4 Embodiments | | | | | | | |
|---|---|---|---|---|---|---|---|
| D (ft) | θ (deg) | EORL (ft) | 4MajAL (ft) | 4MinAL (ft) | EORL/D | 4MajAL/D | 4MinAL/D |
| 2 | 235.7 | 1.526 | 1.88 | 0.88 | 0.763 | 0.94 | 0.44 |
| 3 | 235.7 | 2.289 | 2.82 | 1.32 | 0.763 | 0.94 | 0.44 |
| 4 | 235.7 | 3.052 | 3.76 | 1.76 | 0.763 | 0.94 | 0.44 |
| 5 | 235.7 | 3.815 | 4.7 | 2.2 | 0.763 | 0.94 | 0.44 |
| 6 | 235.7 | 4.578 | 5.64 | 2.64 | 0.763 | 0.94 | 0.44 |
| 7 | 235.7 | 5.341 | 6.58 | 3.08 | 0.763 | 0.94 | 0.44 |
| 8 | 235.7 | 6.104 | 7.52 | 3.52 | 0.763 | 0.94 | 0.44 |
| 9 | 235.7 | 6.867 | 8.46 | 3.96 | 0.763 | 0.94 | 0.44 |
| 10 | 235.7 | 7.63 | 9.4 | 4.4 | 0.763 | 0.94 | 0.44 |
| 11 | 235.7 | 8.393 | 10.34 | 4.84 | 0.763 | 0.94 | 0.44 |
| 12 | 235.7 | 9.156 | 11.28 | 5.28 | 0.763 | 0.94 | 0.44 |
| 12.5 | 235.7 | 9.5375 | 11.75 | 5.5 | 0.763 | 0.94 | 0.44 |
| 13 | 235.7 | 9.919 | 12.22 | 5.72 | 0.763 | 0.94 | 0.44 |
| 13.5 | 235.7 | 10.3005 | 12.69 | 5.94 | 0.763 | 0.94 | 0.44 |
| 14 | 235.7 | 10.682 | 13.16 | 6.16 | 0.763 | 0.94 | 0.44 |
| 15 | 235.7 | 11.445 | 14.1 | 6.6 | 0.763 | 0.94 | 0.44 |
| 16 | 235.7 | 12.208 | 15.04 | 7.04 | 0.763 | 0.94 | 0.44 |
| 18 | 235.7 | 13.734 | 16.92 | 7.92 | 0.763 | 0.94 | 0.44 |
| 20 | 235.7 | 15.26 | 18.8 | 8.8 | 0.763 | 0.94 | 0.44 |
| 21 | 235.7 | 16.023 | 19.74 | 9.24 | 0.763 | 0.94 | 0.44 |
| 22 | 235.7 | 16.786 | 20.68 | 9.68 | 0.763 | 0.94 | 0.44 |
| 24 | 235.7 | 18.312 | 22.56 | 10.56 | 0.763 | 0.94 | 0.44 |
| 29 | 235.7 | 22.127 | 27.26 | 12.76 | 0.763 | 0.94 | 0.44 |
| 33 | 235.7 | 25.179 | 31.02 | 14.52 | 0.763 | 0.94 | 0.44 |
| 35 | 235.7 | 26.705 | 32.9 | 15.4 | 0.763 | 0.94 | 0.44 |
| 40 | 235.7 | 30.52 | 37.6 | 17.6 | 0.763 | 0.94 | 0.44 |
| 45 | 235.7 | 34.335 | 42.3 | 19.8 | 0.763 | 0.94 | 0.44 |
| 48 | 235.7 | 36.624 | 45.12 | 21.12 | 0.763 | 0.94 | 0.44 |
| 50 | 235.7 | 38.15 | 47 | 22 | 0.763 | 0.94 | 0.44 |

Figure 8:
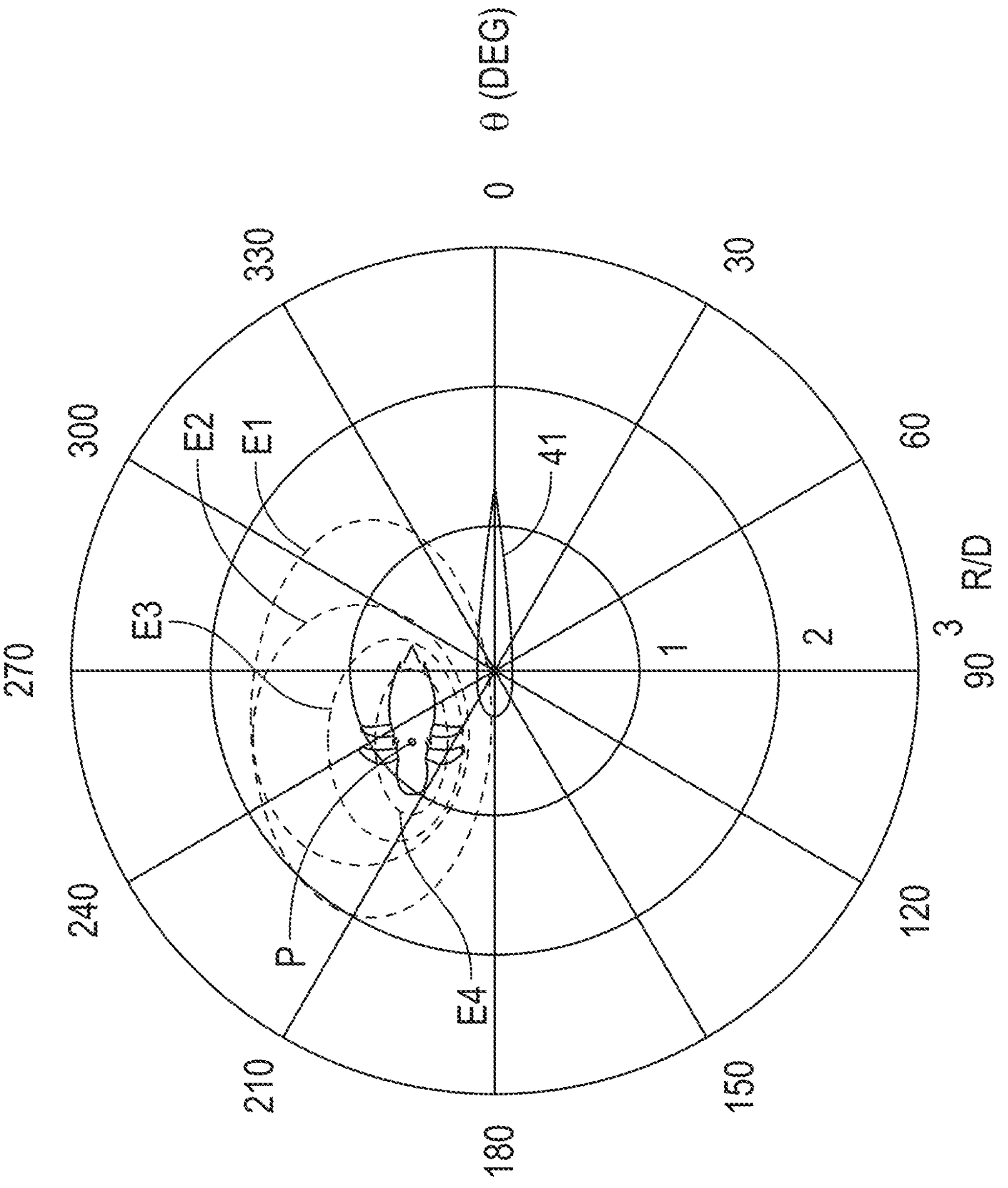
FIG. 8 comprises a schematic side elevation view similar to that of FIG. 7, but showing a first ellipse, a second ellipse, a third ellipse, and a fourth ellipse to illustrate various embodiments of mounting locations of one of the unducted fan propulsors relative to one of the horizontal stabilizers.

Referring to FIG. 8, the locations for P relative to the airfoil section and advantages therefrom described above can also be realized for an unducted fan propulsor system mounted above a horizontal stabilizer. For an unducted fan propulsor mounted to horizontal stabilizers, the foregoing examples and embodiments would be mirrored about the chord line of the airfoil section (again, for purposes of explanation, this chord line may be thought of as an axis passing through θ=0 deg and θ=180 deg in FIG. 11) for the case where the airfoil section 41 produces a lift in the downward direction, such as a horizontal stabilizer, as compared to a wing which produces a lift in the upward direction. The above descriptions for an undermount propulsor can apply, with the location being shifted as shown in FIG. 8 as compared to FIG. 7.

According to the foregoing examples or embodiments, the unducted fan propulsor 38, incorporating the vane assembly described herein, can be incorporated into an airplane or other aircraft having a cruise flight Mach M0 of between 0.70 and 0.85, between 0.75 and 0.85, between 0.75 and 0.79, between 0.5 and 0.9, between 0.7 and 0.9, or between 0.75 and 0.9. A propulsor that is part of an airplane that operates at a high cruise flight Mach number (e.g., greater than 0.7) encounters velocities near the surfaces of the rotor, vanes, and nacelle that approach or exceed the speed of sound, or Mach 1.0. In general, friction drag increases roughly in proportion to the square of the air velocity. However, as the Mach number increases, a significant contributor to the increase in drag can come from wave drag. Wave drag is a drag resulting from shock waves that form as the flow of air near a surface becomes supersonic (e.g., Mach>1.0).

In addition to the cruise flight Mach number, another factor contributing to increased drag on propulsor surfaces is high non-dimensional cruise fan net thrust based on fan annular area and flight speed. The same acceleration of the air stream by the fan that produces thrust also tends to increase the drag force on the rotor, vanes, and nacelle.

Expressing thrust non-dimensionally in a way that accounts for flight speed, ambient conditions, and fan annular area yields a thrust parameter as follows:

$$\frac{F_{net}}{\rho_0 A_{an} V_0^2}$$

In the above thrust parameter, $F_{net}$ is cruise fan net thrust, $\rho_0$ is ambient air density, $V_o$ is cruise flight velocity, and $A_{an}$ is fan stream tube cross-sectional area at the fan inlet. Fan annular area, $A_{an}$, is computed using a maximum radius as the tip radius of the forward-most rotor blades and a minimum radius as the minimum radius of the fan stream tube entering the fan.

A propulsor that operates at a high cruise fan net thrust parameter (e.g., greater than 0.06) tends to have higher propulsor velocities with risk of higher drag on propulsor surfaces.

According to any of the foregoing examples or embodiments, there may be a particularly beneficial range of a dimensionless cruise fan net thrust parameter normalized by ambient density, cruise flight speed squared, and fan stream tube annular area at fan inlet defined by the following expression:

$$0.15 > \frac{F_{net}}{\rho_0 A_{an} V_0^2} > 0.06$$

Both a high cruise flight Mach and high dimensionless cruise fan net thrust parameter contribute to higher drag levels on the propulsor surfaces. Advantageously, the specific unducted fan propulsor positions relative to the wing airfoil section, as described herein, can increase unducted fan propulsor net thrust for a given power input when there is a high cruise flight Mach and a high dimensionless cruise fan net thrust parameter.

Using the conditions described herein, the specific regions for placing the unducted fan propulsor system can be located where there is a relatively higher pressure on the high pressure side of the airfoil, beneath the wings or above the horizontal stabilizers. The higher pressure provides increased thrust from the unducted fan propulsor to thereby offset drag penalties resulting from the installation of unducted fan propulsors.

The foregoing conditions for the placement of the propulsors relative to the wing airfoils can be present for any mounting configuration of the propulsors wing. While the mounting configuration can be fixed, the mounting configuration could be variable. For example, the mounting configuration of an unducted fan propulsor relative to a wing could be different for takeoff as compared to cruise operating conditions. In such a scenario, the foregoing conditions for placement of the propulsors relative to the wing airfoils can be present in either or both operating conditions, or any other operating condition.

FIG. 12 shows a schematic view of an unducted, three-stream, turbine engine, also referred to as an unducted fan propulsor 110, for an aircraft, that may incorporate one or more embodiments of the present disclosure. The unducted fan propulsor is a "three-stream engine" in that its architecture provides three distinct streams (labeled S1, S2, and S3) of thrust-producing airflow during operation, as detailed further below. The unducted fan propulsor 110 can be incorporated as the unducted fan propulsors 38 of FIGS. 1 to 11.

As shown in FIG. 12, the unducted fan propulsor defines an axial direction A, a radial direction R, and a circumferential direction C. Moreover, the unducted fan propulsor defines a longitudinal centerline axis 112 that extends along the axial direction A. In general, the axial direction A extends parallel to the longitudinal centerline axis 112, the radial direction R extends outward from, and inward to, the longitudinal centerline axis 112 in a direction orthogonal to the axial direction A, and the circumferential direction C extends three hundred sixty degrees) (360°) around the longitudinal centerline axis 112. The unducted fan propulsor extends between a forward end 114 and an aft end 116, e.g., along the axial direction A.

The unducted fan propulsor includes a fan assembly 150, a compressor section, a combustion section, and a turbine section. Particularly, as shown in FIG. 12, the unducted fan propulsor 110 includes an engine core 118 and a core cowl 122 that annularly surrounds the engine core 118. The core cowl 122 defines a core inlet 124 having an annular shape that is annular about the longitudinal centerline axis 112. The core cowl 122 further encloses and supports a low-pressure (LP) compressor 126 (also referred to as a booster) for pressurizing the air that enters the core cowl 122 through the core inlet 124. A high-pressure (HP) compressor 128 receives pressurized air from the LP compressor 126 and further increases the pressure of the air. The pressurized air flows downstream to a combustor 130 where fuel is injected into the pressurized air and ignited to raise the temperature and the energy level of the pressurized air, thereby generating combustion gases.

The combustion gases flow from the combustor 130 downstream to a high-pressure (HP) turbine 132. The HP turbine 132 drives the HP compressor 128 through a first shaft, also referred to as a high-pressure (HP) shaft 136 (also referred to as a "high-speed shaft"). In this regard, the HP turbine 132 is drivingly coupled with the HP compressor 128. Together, the HP compressor 128, the combustor 130, and the HP turbine 132 define the engine core 118. The combustion gases then flow to a power turbine or a low-pressure (LP) turbine 134. The LP turbine 134 drives the LP compressor 126 and components of the fan assembly 150 through a second shaft, also referred to as a low-pressure (LP) shaft 138 (also referred to as a "low-speed shaft"). In this regard, the LP turbine 134 is drivingly coupled with the LP compressor 126 and components of the fan assembly 150. The LP shaft 138 is coaxial with the HP shaft 136 in the embodiment of FIG. 12. After driving each of the HP turbine 132 and the LP turbine 134, the combustion gases exit the unducted fan propulsor 110 through a core exhaust nozzle 140. The unducted fan propulsor 110 defines a core flowpath, also referred to as a core duct 142, that extends between the core inlet 124 and the core exhaust nozzle 140. The core duct 142 is an annular duct positioned generally inward of the core cowl 122 along the radial direction R.

The fan assembly 150 includes propulsor or a fan 152, also referred to as a primary fan. For the embodiment of FIG. 12, the fan 152 is an open rotor fan, also referred to as an unducted fan or an unducted propulsor. However, in other embodiments, the fan 152 may be ducted, e.g., by a fan casing or a nacelle circumferentially surrounding the fan 152. The fan 152 includes a plurality of blades 154 (only one shown in FIG. 12) that extends in the radial direction R from a fan root 151 to a fan tip 153. The plurality of blades 154 is rotatable about the longitudinal centerline axis 112 via a fan shaft 156. As shown in FIG. 12, the fan shaft 156 is coupled with the LP shaft 138 via a speed reduction gearbox or a power gearbox, also referred to as a gearbox assembly 155, e.g., in an indirect-drive configuration.

The gearbox assembly 155 is shown schematically in FIG. 12. The gearbox assembly 155 includes a plurality of gears for adjusting the rotational speed of the fan shaft 156 and, thus, the fan 152 relative to the LP shaft 138 to a more efficient rotational fan speed. The gearbox assembly may have a gear ratio of 4:1 to 12:1, or 7:1 to 12:1, or 4:1 to 10:1, or 5:1 to 9:1, or 6:1 to 9:1, and may be configured in an epicyclic star or a planet gear configuration. Preferably, the gearbox assembly has a gear ratio of 4:1 to 10:1 for an unducted fan engine (e.g., the unducted fan propulsor). The gearbox may be a single stage gearbox or a compound gearbox (e.g., having a plurality of stages). The LP shaft 138, the gearbox assembly 155, and the fan shaft 156 are disposed in an in-line configuration such that the LP shaft 138, the gearbox assembly 155, and the fan shaft 156 are coaxial and are each disposed about the longitudinal centerline axis 112.

The blades 154 can be arranged in equal spacing around the longitudinal centerline axis 112. Each blade 154 extends outwardly from a disk 159 generally along the radial direction R. The disk 159 is covered by a fan hub 157 that is rotatable and aerodynamically contoured to promote an airflow through the plurality of blades 154. Each blade 154 has a root and a tip, and a span defined therebetween. Each of the plurality of blades 154 defines a pitch axis P. For the embodiment of FIG. 12, each of the plurality of blades 154 of the fan 152 is rotatable about their respective pitch axis P, e.g., in unison with one another. The unducted fan propulsor 110 includes a fan actuation system having one or more actuators 158 to pitch the blades 154 about their respective pitch axis P. The actuators 158 are disposed within the fan hub 157.

The fan assembly 150 further includes a fan guide vane array 160 that includes a plurality of fan guide vanes 162 (only one shown in FIG. 12) disposed around the longitudinal centerline axis 112. For the embodiment of FIG. 12, the plurality of fan guide vanes 162 is not rotatable about the longitudinal centerline axis 112. Each of the plurality of fan guide vanes 162 has a root and a tip, and a span defined therebetween. The plurality of fan guide vanes 162 can be unshrouded as shown in FIG. 12 or can be shrouded, e.g., by an annular shroud spaced outward from the tips of the fan guide vanes 162 along the radial direction R. Each of the plurality of fan guide vanes 162 defines a vane pitch axis 164. For the embodiment of FIG. 12, each of the plurality of fan guide vanes 162 of the fan guide vane array 160 is rotatable about their respective vane pitch axis 164, e.g., in unison with one another. One or more actuators 166 are controlled to pitch the plurality of fan guide vanes 162 about their respective vane pitch axis 164. In other embodiments, each of the plurality of fan guide vanes 162 is fixed or is unable to be pitched about the vane pitch axis 164. The plurality of fan guide vanes 162 is mounted to a fan cowl 170.

The fan cowl 170 annularly encases at least a portion of the core cowl 122 and is generally positioned outward of the core cowl 122 along the radial direction R. Particularly, a downstream section of the fan cowl 170 extends over a forward portion of the core cowl 122 to define a fan flowpath, also referred to as a fan duct 172. Incoming air enters through the fan duct 172 through a fan duct inlet 176 and exits through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of struts 174 (only one shown in FIG. 12) that extends substantially radially and are circumferentially spaced about the longitudinal centerline axis 112. The plurality of struts 174 is each aerodynamically contoured to direct air flowing thereby. Other struts, in addition to the plurality of struts 174, can be used to connect and to support the fan cowl 170 and the core cowl 122.

The unducted fan propulsor also defines or includes an inlet duct 180. The inlet duct 180 extends between an engine inlet 182 and the core inlet 124 and the fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a splitter 184 of the core cowl 122. The inlet duct 180 is wider than the core duct 142 along the radial direction R. The inlet duct 180 is also wider than the fan duct 172 along the radial direction R.

The fan assembly 150 also includes a mid-fan 186. The mid-fan 186 includes a plurality of mid-fan blades 188 (only one shown in FIG. 2). The plurality of mid-fan blades 188 is rotatable, e.g., about the longitudinal centerline axis 112. The mid-fan 186 is drivingly coupled with the LP turbine 134 via the LP shaft 138. The plurality of mid-fan blades 188 can be arranged in equal circumferential spacing about the longitudinal centerline axis 112. The plurality of mid-fan blades 188 is annularly surrounded (e.g., ducted) by the fan cowl 170. In this regard, the mid-fan 186 is positioned inward of the fan cowl 170 along the radial direction R. The mid-fan 186 is positioned within the inlet duct 180 upstream of both the core duct 142 and the fan duct 172. A ratio of a span of a blade 154 to that of a mid-fan blade 188 (a span is measured from a root to tip of the respective blade) is greater than 2 and less than 10, to achieve the desired benefits of the third stream (S3), particularly, the additional thrust the third stream S3 offers to the engine, which can enable a smaller diameter blade 154 (benefits engine installation).

Accordingly, air flowing through the inlet duct 180 flows across the plurality of mid-fan blades 188 and is accelerated downstream thereof. At least a portion of the air accelerated by the mid-fan blades 188 flows into the fan duct 172 and is ultimately exhausted through the fan exhaust nozzle 178 to produce propulsive thrust. Also, at least a portion of the air accelerated by the plurality of mid-fan blades 188 flows into the core duct 142 and is ultimately exhausted through the core exhaust nozzle 140 to produce propulsive thrust. Generally, the mid-fan 186 is a compression device positioned downstream of the engine inlet 182. The mid-fan 186 is operable to accelerate air into the fan duct 172, also referred to as a secondary bypass passage.

During operation of the unducted fan propulsor, an initial airflow or an incoming airflow passes through the blades 154 of the fan 152 and splits into a first airflow and a second airflow. The first airflow bypasses the engine inlet 182 and flows generally along the axial direction A outward of the fan cowl 170 along the radial direction R. The first airflow accelerated by the blades 154 passes through the fan guide vanes 162 and continues downstream thereafter to produce a primary propulsion stream or a first thrust stream S1. A majority of the net thrust produced by the unducted fan propulsor is produced by the first thrust stream S1. The second airflow enters the inlet duct 180 through the engine inlet 182.

The second airflow flowing downstream through the inlet duct 180 flows through the plurality of mid-fan blades 188 of the mid-fan 186 and is consequently compressed. The second airflow flowing downstream of the mid-fan blades 188 is split by the splitter 184 located at the forward end of the core cowl 122. Particularly, a portion of the second airflow flowing downstream of the mid-fan 186 flows into the core duct 142 through the core inlet 124. The portion of the second airflow that flows into the core duct 142 is progressively compressed by the LP compressor 126 and the HP compressor 128 and is ultimately discharged into the combustion section. The discharged pressurized air stream flows downstream to the combustor 130 where fuel is introduced to generate combustion gases or products.

The combustor 130 defines an annular combustion chamber that is generally coaxial with the longitudinal centerline axis 112. The combustor 130 receives pressurized air from the HP compressor 128 via a pressure compressor discharge outlet. A portion of the pressurized air flows into a mixer. Fuel is injected by a fuel nozzle (omitted for clarity) to mix with the pressurized air thereby forming a fuel-air mixture that is provided to the combustion chamber for combustion. Ignition of the fuel-air mixture is accomplished by one or more igniters (omitted for clarity), and the resulting combustion gases flow along the axial direction A toward, and into, a first stage turbine nozzle 133 of the HP turbine 132. The first stage turbine nozzle 133 is defined by an annular flow channel that includes a plurality of radially extending, circumferentially spaced nozzle vanes 135 that turn the combustion gases so that the combustion gases flow angularly and impinge upon first stage turbine blades of the HP turbine 132. The combustion gases exit the HP turbine 132 and flow through the LP turbine 134 and exit the core duct 142 through the core exhaust nozzle 140 to produce a core air stream, also referred to as a second thrust stream S2. As noted above, the HP turbine 132 drives the HP compressor 128 via the HP shaft 136, and the LP turbine 134 drives the LP compressor 126, the fan 152, and the mid-fan 186 via the LP shaft 138.

The other portion of the second airflow flowing downstream of the mid-fan 186 is split by the splitter 184 into the fan duct 172. The air enters the fan duct 172 through the fan duct inlet 176. The air flows generally along the axial direction A through the fan duct 172 and is ultimately exhausted from the fan duct 172 through the fan exhaust nozzle 178 to produce a third stream, also referred to as a third thrust stream S3.

The third thrust stream S3 is a secondary air stream that increases fluid energy to produce a minority of total propulsion system thrust. In some embodiments, a pressure ratio of the third stream is higher than that of the primary propulsion stream (e.g., a bypass or a propeller driven propulsion stream). The thrust may be produced through a dedicated nozzle or through mixing of the secondary air stream with the primary propulsion stream or a core air stream, e.g., into a common nozzle. In certain embodiments, an operating temperature of the secondary air stream is less than a maximum compressor discharge temperature for the engine. Furthermore, in certain embodiments, aspects of the third stream (e.g., airstream properties, mixing properties, or exhaust properties), and thereby a percent contribution to total thrust, are passively adjusted during engine operation or can be modified purposefully through the use of engine control features (such as fuel flow, electric machine power, variable stators, variable inlet guide vanes, valves, variable exhaust geometry, or fluidic features) to adjust or to improve overall system performance across a broad range of potential operating conditions.

The unducted fan propulsor depicted in FIG. 12 is by way of example only. In other embodiments, the unducted fan propulsor may have other suitable configurations. For example, the fan 152 can be ducted by a fan casing or a nacelle such that a bypass passage is defined between the fan casing and the fan cowl 170. Moreover, in other embodiments, any other suitable number or configuration of compressors, turbines, shafts, or a combination thereof may be provided. In still other embodiments, aspects of the present disclosure may be incorporated into any other suitable turbofan engine, such as, for example, turbofan engines defining two streams (e.g., a bypass stream and a core air stream).

Further, for the depicted embodiment of FIG. 12, the unducted fan propulsor includes an electric machine 190 (e.g., a motor-generator) operably coupled with a rotating component thereof. In this regard, the unducted fan propulsor is a hybrid-electric propulsion machine. Particularly, as shown in FIG. 12, the electric machine 190 is operatively coupled with the LP shaft 138. The electric machine 190 can be mechanically connected to the LP shaft 138, either directly, or indirectly, e.g., by way of a gearbox assembly 192 (shown schematically in FIG. 12). Further, although, in this embodiment the electric machine 190 is operatively coupled with the LP shaft 138 at an aft end of the LP shaft 138, the electric machine 190 can be coupled with the LP shaft 138 at any suitable location or can be coupled to other rotating components of the unducted fan propulsor, such as the HP shaft 136 or the LP shaft 138. For instance, in some embodiments, the electric machine 190 can be coupled with the LP shaft 138 and positioned forward of the mid-fan 186 along the axial direction A.

In some embodiments, the electric machine 190 can be an electric motor operable to drive or to motor the LP shaft 138. In other embodiments, the electric machine 190 can be an electric generator operable to convert mechanical energy into electrical energy. In this way, electrical power generated by the electric machine 190 can be directed to various engine systems or aircraft systems. In some embodiments, the electric machine 190 can be a motor/generator with dual functionality. The electric machine 190 includes a rotor 194 and a stator 196. The rotor 194 is coupled to the LP shaft 138 and rotates with rotation of the LP shaft 138. In this way, the rotor 194 rotates with respect to the stator 196, thereby generating electrical power. Although the electric machine 190 has been described and illustrated in FIG. 12 as having a particular configuration, the present disclosure may apply to electric machines having alternative configurations. For instance, the rotor 194 or the stator 196 may have different configurations or may be arranged in a different manner than illustrated in FIG. 12.

As mentioned above, the mounting locations of the unducted fan propulsor can affect loads on the pylon or wing loads. To better accept higher loads associated with the unducted fan propulsor mounting locations disclosed herein, the unducted fan propulsor can include a relatively high fan bearing radius relative to a fan hub radius, as detailed further below with respect to FIG. 13. Such a high fan bearing radius allows for a desired packaging of, e.g., an actuator of a fan actuation system and one or more fan counterweights in a fan assembly of the unducted fan propulsor. The increased fan bearing radius allows the fan bearings to carry the forward thrust load of the unducted fan propulsor while minimizing, e.g., any moments on the fan bearings in the event of a variation in a distribution of the forward thrust load on the fan bearings. In this way, the high fan bearing radius allows for a variable pitch fan (e.g., the inclusion of a fan actuation system) while maintaining a low radius ratio, a smaller outer casing, which provides for less drag and a larger frontal area for a given fan blade size. Accordingly, the high fan bearing radius allows for an unducted fan propulsor having a fan actuation system mounted therein that accepts the higher loads associated with the mounting locations disclosed above.

Figure 13:
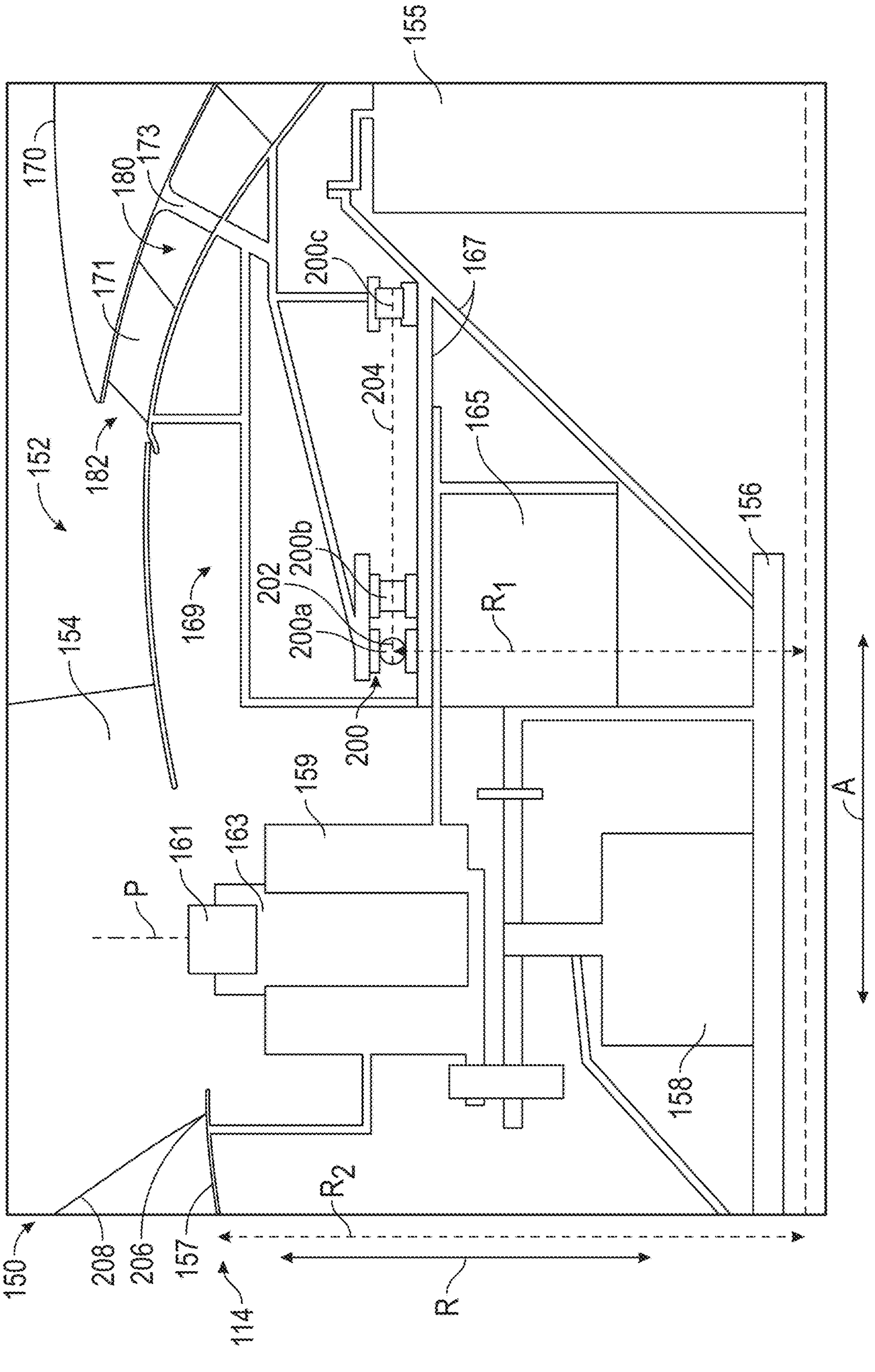
FIG. 13 is a schematic view of a forward end of a fan of the unducted fan propulsor of FIG. 12.

FIG. 13 is a schematic view of the forward end 114 of the fan assembly 150 of the unducted fan propulsor 110 of FIG. 12. As depicted in FIG. 13, each blade 154 defines a base 161 at an inner end along a radial direction R. Each blade 154 is coupled at the base 161 to the disk 159 via a trunnion mechanism 163. In FIG. 13, the base 161 is configured as a dovetail received within a correspondingly shaped dovetail slot of the trunnion mechanism 163. In other aspects, the base 161 may be attached to the trunnion mechanism 163 in any other suitable manner. For example, the base 161 may be attached to the trunnion mechanism 163 using a pinned connection, or any other suitable connection. In still other aspects, the base 161 may be formed integrally with the trunnion mechanism 163. Notably, the trunnion mechanism 163 facilitates rotation of a respective blade 154 about the pitch axis P of the respective blades 154. The fan assembly 150 can also include one or more fan counterweights 165 to balance the fan 152 during operation. Further. the disk 159 is attached to the gearbox assembly 155 through the fan shaft 156, which includes one or more individual structural members 167.

The fan assembly 150 includes a fan frame 169 that is connected to the fan cowl 170 through an inlet vane 171 and a strut 173. In this way, the fan frame 169 is a static or a stationary component that supports static components of the fan assembly 150. While the fan frame 169 is depicted as being connected to the fan cowl 170 through both the inlet vane 171 and the strut 173, the fan frame 169 can be connected to the fan cowl 170 through at least one of the inlet vane 171 or the strut 173.

The fan assembly 150 also includes one or more fan bearings 200 for supporting rotation of the various rotating components of the fan assembly 150, such as the plurality of blades 154 via the fan shaft 156 and the disk 159. More particularly, the various rotating components of the fan assembly 150 rotate with respect to the fan frame 169 via the one or more fan bearings 200. In FIG. 13, the one or more fan bearings 200 includes a first fan bearing **200*a*, a second fan bearing 200*b*, and a third fan bearing 200*c*. The first fan bearing 200*a* is a ball bearing, the second fan bearing 200*b* is a roller bearing, and the third fan bearing 200*c* is a roller bearing. The first fan bearing 200*a* is positioned forward of the second fan bearing 200*b* and the third fan bearing 200*c*. The fan bearings 200 can include any other suitable number or type of bearings for supporting rotation of the plurality of blades 154. For example, the one or more fan bearings 200** can include a pair (two) tapered roller bearings, or any other suitable bearings.

Referring still to FIG. 13, the one or more fan bearings 200 are located axially aft of the disk 159 and the trunnion mechanisms 163 and radially outward of the one or more actuators 158 along the radial direction R and also outward of the one or more fan counterweights 165 along the radial direction R. In particular, the fan bearings 200 are located axially between the disk 159 and the gearbox assembly 155. Such a configuration of the fan bearings 200 allows for the actuators 158 to be axially aligned with the disk 159 and the trunnion mechanisms 163 along the axial direction A and radially inward of the disk 159 and the trunnion mechanisms 163 along the radial direction R. Moreover, such a configuration allows for the one or more fan counterweights 165 to be positioned adjacent to the one or more actuators 158.

As shown in FIG. 13, the one or more fan bearings 200 define a fan bearing radius $R_1$ along the radial direction R. The fan bearing radius $R_1$ is defined as a distance along the radial direction R from the longitudinal centerline axis 112 of the unducted fan propulsor 110 to a central axis or a center point of the one or more fan bearings 200. More particularly, each of the first fan bearing **200*a*, the second fan bearing 200*b*, and the third fan bearing 200*c* are radially aligned such that a center point 202 of the first fan bearing 200*a* and a central axis 204 of the second fan bearing 200*b* and the third fan bearing 200*c* are each positioned at the same radial distance from the longitudinal centerline axis 112. In some aspects, one or more of the fan bearings 200 may be stepped or otherwise positioned at different distances from the longitudinal centerline axis 112 along the radial direction R. In such aspects, the fan bearing radius $R_1$ refers to a radius of the innermost fan bearing 200 along the radial direction R (i.e., a distance of the central point 202 or the center axis 204 of the innermost fan bearing 200 along the radial direction R to the longitudinal centerline axis 112**).

The fan hub 157 defines a hub radius $R_2$ along the radial direction R. The hub radius $R_2$ is defined as a radial distance of an outermost point of the fan hub 157 along the radial direction R to the longitudinal centerline axis 112 of the unducted fan propulsor 110. In particular, the hub radius $R_2$ is a distance along the radial direction R from the longitudinal centerline axis 112 to a radially innermost point 206 of a leading edge 208 of the blades 154 (to the fan root 151 at the leading edge 208. The hub radius $R_2$ is indicative of an overall size of a core portion of the fan assembly 150. Accordingly, the fan assembly 150 defines a hub radius to fan bearing radius ratio $R_2:R_1$ (i.e., a ratio of the hub radius $R_2$ to the fan bearing radius $R_1$) of less than or equal to 2.75, such as less than or equal to 2.5, such as less than or equal to 2, such as less than or equal to 1.75. More particularly, the hub radius to fan bearing radius ratio $R_2:R_1$ is greater than or equal to one (1) and less than or equal to 1.5.

The plurality of blades 154 are rotatable about the axial direction A at a maximum rotational speed during operation of the fan assembly 150. The maximum rotational speed refers to a maximum speed at which the blades 154 are configured to rotate during a full power condition of the unducted fan propulsor 110, such as when the unducted fan propulsor 110 is generating a maximum takeoff thrust. The one or more fan bearings 200 supporting rotation of the plurality of blades 154 may define a DN value during operation of the fan assembly 150 and rotation of the plurality of blades 154 at the maximum rotational speed of at least about 0.6 million. For example, in certain exemplary embodiments, the one or more fan bearings 200 supporting rotation of the plurality of blades 154 may define a DN value during rotation of the plurality of blades 154 of at least 0.7 million, at least 0.8 million, at least 1 million, or at least 1.5 million. As used herein, the term "DN value" refers to a fan bearing speed quantifier calculated by multiplying a bore of the bearing in millimeters by a rotational speed in revolutions per minute (RPM). The bore of the one or more fan bearings 200 supporting rotation of the plurality of blades 154 of the fan assembly 150 refers to a distance from the longitudinal centerline axis 112 to an inner race of the one or more fan bearings 200.

Accordingly, in order to maintain the DN value of the one or more fan bearings 200 below one or more of the above stated DN values, the fan assembly 150 may define a relatively low maximum rotational speed during operation. For example, in certain exemplary embodiments, the fan assembly 150 may define a maximum rotational speed of less than 8,500 RPM during operation. More specifically, in certain exemplary embodiments, the fan assembly 150 may define a maximum rotational speed of less than 8,000 RPM during operation, less than 7,500 rpm during operation, less than 7,000 RPM during operation, less than 6,500 rpm during operation, or less than 6,000 RPM during operation.

As discussed above, inclusion of a relatively high fan bearing radius relative to a fan hub radius may allow for a desired packaging of, e.g., an actuator of a fan actuation system and one or more fan counterweights in a fan assembly of an unducted fan propulsor. Moreover, wherein the turbofan engine as a geared turbofan engine (i.e., including a gearbox connecting a driveshaft and a fan shaft while reducing a rotational speed of the fan shaft relative to the driveshaft) the increased fan bearing radius may additionally provide for a more stable fan during operation. Specifically, with non-geared unducted fan propulsors, a forward thrust load generated by the fan during operation may be counteracted by a reverse thrust load generated by a turbine section of the unducted fan propulsor (the turbine section being directly connected to the fan via a shaft in such a configuration). By contrast, within a geared unducted fan propulsor, such as the unducted fan propulsor 110 depicted in FIG. 12, the forward ball bearing (e.g., the first fan bearing 200*a*) is required to carry substantially all of an amount of forward thrust generated by the fan during operation, as the gearbox assembly prevents the LP shaft from offsetting such forward thrust load of the fan with a reverse thrust load of the turbine section. Accordingly, the increased fan bearing radius allows the one or more fan bearings to carry the forward thrust load while minimizing, e.g., any moments on such one or more fan bearings in the event of a variation in a distribution of the forward thrust load on the one or more fan bearings.

Further aspects of the disclosure are provided by the subject matter of the following clauses.

An aircraft is provided that includes a fuselage, an airfoil extending from the fuselage, the airfoil having an airfoil section with a leading edge (LE) and a trailing edge (TE), a chord extending between the LE and TE, and an effective quarter chord point (QC) along the chord measured from the LE, an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other, and an ellipse origin positioning line (EOR) having a length (EORL) extending from the QC to an ellipse origin (OR) and at an angle θ as measured from a vector from the QC to the TE of the airfoil section to the line EOR, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein the P of the unducted fan propulsor is located within a first ellipse having a first major axis length (1 MajAL) and a first minor axis length (1 MinAL) with a first ellipse origin defined by EORL/D of 0.938 and θ of 253.6°, and where 1 MajAL/D is 2.8 and 1 MinAL/D is 1.7.

In the preceding clause, the P of the unducted fan propulsor is located in a second ellipse having a second major axis length (2 MajAL) and a second minor axis length (2 MinAL) with a second ellipse origin defined by EORL/D of 1.051 and 0 of 248.8°, and where 2 MajAL/D is 1.86 and 2 MinAL/D is 1.56.

In any of the preceding clauses, the P of the unducted fan propulsor is located in a third ellipse having a third major axis length (3 MajAL) and a third minor axis length (3 MinAL) with a third ellipse origin defined by EORL/D of 0.870 and θ of 239.6°, where 3 MajAL/D is 1.4 and 3 MinAL/D is 0.9.

In any of the preceding clauses, the P of the unducted fan propulsor is located in a fourth ellipse having a fourth major axis length (4 MajAL) and a fourth minor axis length (4 MinAL) with a fourth ellipse origin defined by EORL/D of 0.763 and θ of 235.7°, and where 4 MajAL/D is 0.94 and 4 MinAL/D is 0.44.

In any of the preceding clauses, the unducted fan propulsor is undermounted to the airfoil, such as a wing, with one or more intermediate structures.

In any of the preceding clauses, the unducted fan propulsor has a cruise flight Mach M0 of between 0.70 and 0.85, between 0.5 and 0.9, between 0.7 and 0.9, or between 0.75 and 0.9.

In any of the preceding clauses, the rotating blades diameter is between 8 to 16 feet or between 12 to 16 feet. In any of the preceding clauses, the aircraft having a wing defining the airfoil and one or two unducted fan propulsors are mounted to the wing.

In any of the preceding clauses, wherein the aircraft are aircraft types A, B, C or G as defined in TABLES 1 and 2.

An aircraft is provided including a fuselage, an airfoil extending from the fuselage, the airfoil having an airfoil section with a leading edge (LE) and a trailing edge (TE), a chord extending between the LE and TE, and an effective quarter chord point (QC) along the chord measured from the LE, an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other, and a positioning line (R) having a length (RL) and extending from the QC to the point P of the unducted fan propulsor and at an angle θ as measured from a vector from the QC to the TE of the airfoil section to the line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein $0.065<RL/D<1.98$ and θ is between 187° and 340°, and wherein RL/D and θ of the P of the unducted fan propulsor adhere to the following expressions:

$$\frac{RL}{D}+\frac{\left(\sqrt{(1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}>0$$

and $$\frac{RL}{D}+\frac{\left(-\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}<0.$$

In the preceding clause, $0.254<RL/D<1.86$ and θ is between 199° and 306°, and the P of the unducted fan propulsor is defined by the following expressions:

$$\frac{RL}{D}+\frac{\left(\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}>0$$

and $$\frac{RL}{D}+\frac{\left(-\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}<0.$$

In any of the two preceding clauses, $0.369<RL/D<1.43$ and θ is between 204° and 291°, and the P of the unducted fan propulsor is defined by the following expressions:

$$\frac{RL}{D}+\frac{\left(\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}>0$$

and $$\frac{RL}{D}+\frac{\left(-\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}<0.$$

In any of the three preceding clauses: 0.477<RL/D<0.9455 and θ is between 211° and 274°, and the P of the unducted fan propulsor is defined by the following expressions:

$$\frac{RL}{D}+\frac{\left(\sqrt{0.01069156*\left[0.036*\sin^2(\theta)-0.3485*\cos^2(\theta)+0.5418*\sin(\theta)*\cos(\theta)\right]}+0.139167*\sin(\theta)+0.020812*\cos(\theta)\right)}{0.2209*\sin^2(\theta)+0.0484*\cos^2(\theta)}>0$$

and $$\frac{RL}{D}+\frac{\left(-\sqrt{0.01069156*\left[0.036*\sin^2(\theta)-0.3485*\cos^2(\theta)+0.5418*\sin(\theta)*\cos(\theta)\right]}+0.139167*\sin(\theta)+0.020812*\cos(\theta)\right)}{0.2209*\sin^2(\theta)+0.0484*\cos^2(\theta)}<0.$$

In any of the four preceding clauses, the unducted fan propulsor is undermounted to the airfoil, such as a wing, with one or more intermediate structures.

In any of the preceding clauses, the unducted fan propulsor has a cruise flight Mach M0 of between 0.70 and 0.85, between 0.5 and 0.9, between 0.7 and 0.9, or between 0.75 and 0.9.

An aircraft is provided that includes a fuselage, an airfoil extending from the fuselage, the airfoil having an airfoil section with a leading edge (LE) and a trailing edge (TE), a chord extending between the LE and TE, and an effective quarter chord point (QC) along the chord measured from the LE, an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other, and a positioning line (R) having a length (RL) and extending from the QC to the point P of the unducted fan propulsor and at an angle θ as measured from a vector from the QC to the TE of the airfoil section to the line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein RL/D≤2 and θ is between 187° and 342°.

In the of the preceding clauses, 0.15≤RL/D.

In any of the preceding clauses, 0.35≤RL/D, and preferably RL/D is about 0.72.

In any of the preceding clauses, wherein θ is between 198° and 310°, and preferably between 205° and 285°.

In any of the preceding clauses, the unducted fan propulsor operates at a cruise flight Mach M0 of between 0.5 and 0.9, preferably between 0.7 and 0.9, and more preferably between 0.75 and 0.9.

In any of the preceding clauses, the unducted fan propulsor has a dimensionless cruise fan net thrust parameter expressed as follows:

$$0.15>\frac{F_{net}}{\rho_0 A_{an} V_0^2}>0.06,$$

wherein $F_{net}$ is cruise fan net thrust, ρ is ambient air density, $V_o$ is cruise flight velocity, and $A_{an}$ is annular cross-sectional area perpendicular to an axis of rotation of a rotor axis of rotation.

In any of the preceding clauses, the unducted fan propulsor is undermounted to the airfoil with one or more intermediate structures.

In any of the foregoing clauses, the P of the unducted fan propulsor is variable to accommodate different operating conditions.

In any of the preceding clauses, the aircraft includes a plurality of the unducted fan propulsors.

In the preceding clause, the plurality of the unducted fan propulsors may be each mounted to the same airfoil, such as a wing or horizontal stabilizer; or the plurality of the unducted fan propulsors may be each mounted to different airfoils, such as a wing or horizontal stabilizer; or combinations thereof.

In any of the preceding clauses, wherein the unducted propulsor has two arrays of blades and only one of the array of blades is rotating.

An aircraft is provided that includes a fuselage, an airfoil extending from the fuselage, the airfoil having an airfoil section defining an effective quarter chord point (QC), an unducted fan propulsor mounted relative to the airfoil section on a high pressure side thereof, the unducted fan propulsor having a centerline (CL), a plurality of counter-clockwise rotating blades arranged in a forward array and a plurality clockwise rotating blades arranged in a rearward array, wherein one of the forward and rearward array of blades define a maximum outer diameter (D), a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other, and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, wherein the P of the unducted fan propulsor is located within a first ellipse having a first major axis length (1 MajAL) and a first minor axis length (1 MinAL) with a first ellipse origin defined by EORL/D of 0.938 and θ of 253.6°, and where 1 MajAL/D is 2.8 and 1 MinAL/D is 1.7.

An aircraft is provided that includes a fuselage, an airfoil extending from the fuselage, the airfoil having an airfoil section and the airfoil section having an effective quarter chord point (QC), and a plurality of rotating blades defining a maximum outer diameter (D), a point (P) located at an intersection of the CL and a line perpendicular to the CL that passes through a midpoint between leading and trailing edges nearest the root of one of the plurality of blades, and an ellipse origin positioning line (EOR) having a length (EORL) extending from the QC to an ellipse origin (OR) and at an angle θ measured positive in a counter-clockwise direction when the high pressure side of the airfoil section is below the airfoil section, and measured positive in a clockwise direction when the high pressure side of the airfoil section is above the airfoil section, and wherein the P of the unducted fan propulsor is located within a first ellipse having a first major axis length (1 MajAL) and a first minor axis length (1 MinAL) with a first ellipse origin defined by EORL/D of 0.938 and θ of 253.6°, and where 1 MajAL/D is 2.8 and 1 MinAL/D is 1.7.

An aircraft is provided that includes a fuselage, an airfoil extending from the fuselage, the airfoil having an airfoil section defining an effective quarter chord point (QC), an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D), a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other, and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, wherein 0.065<RL/D<1.98 and θ is between 187° and 340°, and wherein RL/D and θ of the P of the unducted fan propulsor adhere to the following expressions:

$$\frac{RL}{D}+\frac{\Big(\sqrt{(1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\Big)}{1.96*\sin^2(\theta)+0.7225*\cos^2(\theta)}>0$$

and $$\frac{RL}{D}+\frac{\left(-\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}<0.$$

The aircraft of the preceding clause, wherein 0.254<RL/D<1.86 and θ is between 199° and 306°, and the P of the unducted fan propulsor is defined by the following expressions:

$$\frac{RL}{D}+\frac{\left(\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}>0$$

and $$\frac{RL}{D}+\frac{\left(-\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}<0.$$

The aircraft of any preceding clause, wherein 0.369<RL/D<1.43 and θ is between 204° and 291°, and the P of the unducted fan propulsor is defined by the following expressions:

$$\frac{RL}{D}+\frac{\left(\sqrt{0.09923*\left[0.2964*\sin^2(\theta)-0.36*\cos^2(\theta)+0.66*\sin(\theta)*\cos(\theta)\right]}+0.3675*\sin(\theta)+0.891*\cos(\theta)\right)}{0.49*\sin^2(\theta)+0.2025*\cos^2(\theta)}>0$$

and $$\frac{RL}{D}+\frac{\left(-\sqrt{0.09923*\left[0.2964*\sin^2(\theta)-0.36*\cos^2(\theta)+0.66*\sin(\theta)*\cos(\theta)\right]}+0.3675*\sin(\theta)+0.0891*\cos(\theta)\right)}{0.49*\sin^2(\theta)+0.2025*\cos^2(\theta)}<0.$$

The aircraft of any preceding clause, wherein 0.477<RL/D<0.9455 and θ is between 211° and 274°, and the P of the unducted fan propulsor is defined by the following expressions:

$$\frac{RL}{D}+\frac{\left(\sqrt{0.01069156*\left[0.036*\sin^2(\theta)-0.3485*\cos^2(\theta)+0.5418*\sin(\theta)*\cos(\theta)\right]}+0.139167*\sin(\theta)+0.020812*\cos(\theta)\right)}{0.2209*\sin^2(\theta)+0.0484*\cos^2(\theta)}>0$$

and $$\frac{RL}{D}+\frac{\left(-\sqrt{0.01069156*\left[0.036*\sin^2(\theta)-0.3485*\cos^2(\theta)+0.5418*\sin(\theta)*\cos(\theta)\right]}+0.139167*\sin(\theta)+0.020812*\cos(\theta)\right)}{0.2209*\sin^2(\theta)+0.0484*\cos^2(\theta)}<0.$$

The aircraft of any preceding clause, wherein the unducted fan propulsor is undermounted to the airfoil with one or more intermediate structures.

The aircraft of preceding clause, wherein the P of the unducted fan propulsor is variable to accommodate different operating conditions.

An aircraft is provided that includes a fuselage, an airfoil extending from the fuselage, the airfoil having an airfoil section defining an effective quarter chord point (QC), an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D), a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other, and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section; wherein RL/D≤2 and θ is between 187° and 342°.

The aircraft of the preceding clause, wherein 0.15≤RL/D.

The aircraft of any preceding clause, wherein 0.35≤RL/D, and preferably RL/D is about 0.72.

The aircraft of any preceding clause, wherein θ is between 198° and 310°, and preferably between 205° and 285°.

The aircraft of any preceding clause, wherein the unducted fan propulsor operates at a cruise flight Mach M0 of between 0.5 and 0.9, preferably between 0.7 and 0.9, and more preferably between 0.75 and 0.9.

The aircraft of any preceding clause, wherein the unducted fan propulsor has a dimensionless cruise fan net thrust parameter expressed as follows:

$$0.15>\frac{F_{net}}{\rho_0 A_{an} V_0^2}>0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

The aircraft of any preceding clause, wherein the unducted fan propulsor is undermounted to the airfoil with one or more intermediate structures.

The aircraft of any preceding clause, wherein the P of the unducted fan propulsor is variable to accommodate different operating conditions.

A method of assembly including using an aircraft body including a fuselage and an airfoil extending from the fuselage, wherein the airfoil has an airfoil section defining an effective quarter chord point (QC), and attaching an unducted fan propulsor to the aircraft body relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D), a point (P) located at the intersection of the CL and a line HP perpendicular to the axial centerline CL that passes through the axial midpoint between a rearward trailing edge at a root of a blade of the rearward array and a forward leading edge at a root of a blade of the forward array when the forward leading edge and rearward trailing edge of the respective blades are aligned with each other, and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position, wherein 0.07≤RL/D≤2.0 and θ is between 187° and 342.°.

The method of the preceding clause, wherein 0.15≤RL/D.

The method of any preceding clause, wherein 0.35≤RL/D, and preferably RL/D is about 0.72.

The method of any preceding clause, wherein θ is between 198° and 310°, and preferably between 205° and 285°.

The method of any preceding clause, wherein the unducted fan propulsor operates at a cruise flight Mach M0 of between 0.5 and 0.9, preferably between 0.7 and 0.9, and more preferably between 0.75 and 0.9.

The method of any preceding clause, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

The method of any preceding clause, wherein the unducted fan propulsor is undermounted to the airfoil with one or more intermediate structures.

The method of any preceding clause, wherein the P of the unducted fan propulsor is variable to accommodate different operating conditions.

A method of assembly including using an aircraft body including a fuselage and an airfoil extending from the fuselage, the airfoil having an airfoil section with a leading edge (LE) and a trailing edge (TE), a chord extending between the LE and TE, and an effective quarter chord point (QC) along the chord measured from the LE, wherein the airfoil has an airfoil section defining an effective quarter chord point (QC), and attaching an unducted fan propulsor to the aircraft body relative to the airfoil section on a high pressure side thereof; the unducted fan propulsor having a centerline (CL) and a plurality of blades arranged in one or more arrays, each of the blades having a root and the plurality of blades defining a maximum outer diameter (D), the unducted fan propulsor having a point (P) defined as one of (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and an ellipse origin positioning line (EOR) having a length (EORL) extending from the QC to an ellipse origin (OR) and at an angle θ as measured from a vector from the QC to the TE of the airfoil section to the line EOR, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein the P of the unducted fan propulsor is located within a first ellipse having a first major axis length (1 MajAL) and a first minor axis length (1 MinAL) with a first ellipse origin defined by EORL/D of 0.938 and θ of 253.6°, and where 1 MajAL/D is 2.8 and 1 MinAL/Dis 1.7.

The method of the preceding clause, wherein the P of the unducted fan propulsor is located in a second ellipse having a second major axis length (2 MajAL) and a second minor axis length (2 MinAL) with a second ellipse origin defined by EORL/D of 1.051 and θ of 248.8°, and where 2 MajAL/D is 1.86 and 2 MinAL/D is 1.56.

The method of any preceding clause, wherein the P of the unducted fan propulsor is located in a third ellipse having a third major axis length (3 MajAL) and a third minor axis length (3 MinAL) with a third ellipse origin defined by EORL/D of 0.870 and θ of 239.6°, where 3 MajAL/D is 1.4 and 3 MinAL/D is 0.9.

The method of any preceding clause, wherein the P of the unducted fan propulsor is located in a fourth ellipse having a fourth major axis length (4 MajAL) and a fourth minor axis length (4 MinAL) with a fourth ellipse origin defined by EORL/D of 0.763 and θ of 235.7°, and where 4 MajAL/D is 0.94 and 4 MinAL/D is 0.44.

An aircraft including a fuselage, a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D), a point (P) located at an intersection of the CL and a line HP perpendicular to the CL that passes through an axial mid-point between a rearward trailing edge at a root of a blade of the rearward array and a forward leading edge at a root of a blade of the forward array when the forward leading edge and rearward trailing edge of the respective blades are aligned with each other, and an airfoil section having an effective quarter chord point QC, a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing, wherein 0.07≤RL/D≤2.0 and θ is between 187° and 342°.

An aircraft including a fuselage, a pair of horizontal stabilizers extending relative to the fuselage, two or more unducted fan propulsors, each of the unducted fan propulsors is mounted relative to one of the horizontal stabilizers on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D), a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC, a positioning line (R) having a length (RL) and extending from the QC to the point P of the unducted fan propulsor at an angle θ measured positive in a clockwise direction when the high pressure side of the airfoil section is above the airfoil section when viewed looking from an outboard position towards an inboard position of the wing, wherein 0.07≤RL/D≤2.0 and θ is between 187° and 342°.

In any of the preceding clauses, the unducted fan propulsor is undermounted to the airfoil, such as a wing, with one or more intermediate structures.

In any of the preceding clauses, the P of the unducted fan propulsor is variable to accommodate different operating conditions.

In any of the preceding clauses the drive mechanism may be a gas turbine engine and associated transmission to delivers torque from the drive mechanism to the propeller assembly.

In any of the preceding clauses, the unducted fan propulsor is incorporated into an airplane or other aircraft having a cruise flight Mach M0 of between 0.70 and 0.85, between 0.75 and 0.85, between 0.75 and 0.79, between 0.5 and 0.9, between 0.7 and 0.9, or between 0.75 and 0.9.

In any of the preceding clauses, the unducted fan propulsors is connected to the wing (or horizontal stabilizer) through a pylon.

In any of the preceding clauses, the rotating blades diameter (D) may be between 8 to 16 feet or 12 to 16 feet.

In any of the preceding clauses, each of the propulsors including a drive mechanism comprising a gas turbine engine assembly comprising in serial order a compressor, combustor, high pressure turbine and power turbine.

In any of the preceding clauses, the propulsor having a pitch angle between −5 and +5 degrees, or −3 and 0 degrees.

In any of the preceding clauses, the propulsor having an inward toe angle of between 0 and 5 degrees, or 1 and 3 degrees.

In any of the preceding clauses, the rotating blades diameter is between 8 to 16 feet or between 12 to 16 feet.

In any of the preceding clauses, the aircraft having a wing defining the airfoil and one or two unducted fan propulsors are mounted to the wing.

In any of the preceding clauses, wherein the aircraft are aircraft types A, B, C or G as defined in TABLES 1 and 2.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. An aircraft comprising:

a fuselage;

an airfoil extending from the fuselage, the airfoil having an airfoil section defining a quarter-chord location (QC);

an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward array of blades and the rearward array of blades are rotating blades that define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the airfoil; wherein 0.07≤RL/D≤2.0 and θ is between 187° and 342°, wherein the unducted fan propulsor defines a radial direction and a longitudinal centerline axis, and includes:

a fan having the plurality of blades of the forward array or the rearward array coupled to a fan shaft, the plurality of blades defining a base at an inner end along the radial direction;

a hub covering the base of each of the plurality of blades, the hub defining a hub radius that extends radially from the longitudinal centerline axis to the hub at a leading edge of the plurality of blades; and one or more fan bearings for supporting rotation of the plurality of blades, the one or more fan bearings defining a fan bearing radius from the longitudinal centerline axis to center point of the one or more fan bearings, wherein a ratio of the hub radius to the fan bearing radius is greater than or equal to 1.00 and less than 2.75.

2. The aircraft of claim 1, wherein the ratio of the hub radius to the fan bearing radius is less than or equal to about 1.5.

3. The aircraft of claim 1, wherein the one or more fan bearings include at least one of a ball bearing or a roller bearing or a roller bearing.

4. The aircraft of claim 1, wherein the fan includes a fan actuation system having one or more actuators for changing a pitch of each of the plurality of blades, the one or more fan bearings being located radially outward of the one or more actuators.

5. The aircraft of claim 1, wherein the fan includes one or more fan counterweights, the one or more fan bearings being located radially outward of the one or more fan counterweights.

6. The aircraft of claim 1, wherein the unducted fan propulsor further includes a gearbox assembly, the fan being driven by a turbine section of the unducted fan propulsor.

7. The aircraft of claim 6, wherein the one or more fan bearings are located axially between the fan and the gearbox assembly.

8. An aircraft comprising:

a fuselage;

an airfoil extending from the fuselage, the airfoil having an airfoil section defining an effective quarter chord point (QC);

an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades that define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, when viewed looking for an outboard position towards an inboard position; wherein the P of the unducted fan propulsor is located within a first ellipse having a first major axis length (1 MajAL) and a first minor axis length (1 MinAL) with a first ellipse origin defined by EORL/D of 0.938 and θ of 253.6°, and where 1 MajAL/D is 2.8 and 1 MinAL/D is 1.7, wherein the unducted fan propulsor defines a radial direction and a longitudinal centerline axis, and includes:

a fan having the plurality of blades of the forward array or the rearward array coupled to a fan shaft, the plurality of blades defining a base at an inner end along the radial direction;

a hub covering the base of each of the plurality of blades, the hub defining a hub radius that extends radially from the longitudinal centerline axis to the hub at a leading edge of the plurality of blades; and one or more fan bearings for supporting rotation of the plurality of blades, the one or more fan bearings defining a fan bearing radius from the longitudinal centerline axis to center point of the one or more fan bearings, wherein a ratio of the hub radius to the fan bearing radius is less than 1.75.

9. The aircraft of claim 8, wherein the ratio of the hub radius to the fan bearing radius is less than or equal to about 1.5.

10. The aircraft of claim 8, wherein the one or more fan bearings include at least one of a ball bearing or a roller bearing or a roller bearing.

11. The aircraft of claim 8, wherein the fan includes a fan actuation system having one or more actuators for changing a pitch of each of the plurality of blades, the one or more fan bearings being located radially outward of the one or more actuators.

12. The aircraft of claim 8, wherein the fan includes one or more fan counterweights, the one or more fan bearings being located radially outward of the one or more fan counterweights.

13. The aircraft of claim 8, wherein the unducted fan propulsor further includes a gearbox assembly, the fan being driven by a turbine section of the unducted fan propulsor.

14. The aircraft of claim 13, wherein the one or more fan bearings are located axially between the fan and the gearbox assembly.

15. An aircraft comprising:

a fuselage;

an airfoil extending from the fuselage, the airfoil having an airfoil section defining an effective quarter-chord point (QC);

an unducted fan propulsor mounted relative to the airfoil section on a high pressure side thereof, the unducted fan propulsor having a centerline (CL), a plurality of blades arranged in a forward array and a plurality of blades arranged in a rearward array, wherein one of the forward and rearward array of blades are rotating blades that define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position, wherein 0.065<RL/D<1.98 and θ is between 187° and 340°, and wherein RL/D and θ of the P of the unducted fan propulsor adhere to the following expressions:

$$\frac{RL}{D} + \frac{\left(\sqrt{\left(1.4161 * \left[1.88978 * \sin^2(\theta) - 0.0875 * \cos^2(\theta) + 0.477 * \sin(\theta) * \cos(\theta)\right]} + 1.764 * \sin(\theta) + 0.19146 * \cos(\theta)\right)}{1.96 * \sin^2(\theta) + 0.7225 * \cos^2(\theta)} > 0$$

and $$\frac{RL}{D} + \frac{\left(-\sqrt{1.4161 * \left[1.88978 * \sin^2(\theta) - 0.0875 * \cos^2(\theta) + 0.477 * \sin(\theta) * \cos(\theta)\right]} + 1.764 * \sin(\theta) + 0.19146 * \cos(\theta)\right)}{1.96 * \sin^2(\theta) + 0.7225 * \cos^2(\theta)} < 0$$

wherein the unducted fan propulsor defines a radial direction and a longitudinal centerline axis, and includes:

a fan having the plurality of blades of the forward array or the rearward array coupled to a fan shaft, the plurality of blades defining a base at an inner end along the radial direction;

a hub covering the base of each of the plurality of blades, the hub defining a hub radius that extends radially from the longitudinal centerline axis to the hub at a leading edge of the plurality of blades; and one or more fan bearings for supporting rotation of the plurality of blades, the one or more fan bearings defining a fan bearing radius from the longitudinal centerline axis to center point of the one or more fan bearings, wherein a ratio of the hub radius to the fan bearing radius is less than 1.75.

16. The aircraft of claim 15, wherein the one or more fan bearings include at least one of a ball bearing or a roller bearing or a roller bearing.

17. The aircraft of claim 15, wherein the fan includes a fan actuation system having one or more actuators for changing a pitch of each of the plurality of blades, the one or more fan bearings being located radially outward of the one or more actuators.

18. The aircraft of claim 15, wherein the fan includes one or more fan counterweights, the one or more fan bearings being located radially outward of the one or more fan counterweights.

19. The aircraft of claim 15, wherein the unducted fan propulsor further includes a gearbox assembly, the fan being driven by a turbine section of the unducted fan propulsor.

20. The aircraft of claim 19, wherein the one or more fan bearings are located axially between the fan and the gearbox assembly.

* * * * *